(12) United States Patent
Suzuki

(10) Patent No.: US 8,338,973 B2
(45) Date of Patent: Dec. 25, 2012

(54) WATER FLOW ELECTRIC POWER GENERATOR

(75) Inventor: Kiyomi Suzuki, Miki (JP)

(73) Assignee: Nova Laboratory Co., Ltd., Miki-shi (JP)

( * ) Notice: Subject to any disclaimer, the term of this patent is extended or adjusted under 35 U.S.C. 154(b) by 233 days.

(21) Appl. No.: 12/742,428

(22) PCT Filed: Nov. 10, 2008

(86) PCT No.: PCT/JP2008/003244
§ 371 (c)(1),
(2), (4) Date: May 21, 2010

(87) PCT Pub. No.: WO2009/063605
PCT Pub. Date: May 22, 2009

(65) Prior Publication Data
US 2010/0264660 A1    Oct. 21, 2010

(30) Foreign Application Priority Data

Nov. 12, 2007 (JP) ................................ 2007-292735

(51) Int. Cl.
F03B 13/00 (2006.01)
(52) U.S. Cl. .......................................... 290/43; 290/54
(58) Field of Classification Search .................... 290/43, 290/54; 415/7; 60/398
See application file for complete search history.

(56) References Cited

U.S. PATENT DOCUMENTS

| | | | |
|---|---|---|---|
| 1,830,985 A | | 11/1931 | Dreier |
| 4,412,417 A | * | 11/1983 | Dementhon ..................... 60/497 |
| 4,524,285 A | | 6/1985 | Rauch |

(Continued)

FOREIGN PATENT DOCUMENTS

DE    19748635 A1    5/1999

(Continued)

OTHER PUBLICATIONS

ISA Japanese Patent Office, International Search Report of PCT/JP2008/003244, Dec. 9, 2008, Japan, 3 pages.

(Continued)

Primary Examiner — Tho D Ta
(74) Attorney, Agent, or Firm — Alleman Hall McCoy Russell & Tuttle LLP

(57) ABSTRACT

To provide a water flow electric power generator capable of generating electric power for a long period of time, the water flow electric power generator including: an underwater rotating body (32) configured to rotate by a water flow (11); a driving liquid pressure pump (34) configured to hold a front end (52) of the underwater rotating body (32) at a predetermined position under water; a power transmission unit (40) configured to transfer a rotational power of the underwater rotating body (32) held by the driving liquid pressure pump (34) to above a water surface (9); and an electric power generator (39) disposed above the water surface to be driven by the power transferred by the power transmission unit (40), wherein the underwater rotating body (32) includes: a body portion (51) having a streamline shape from a front end thereof to a rear end thereof; a supporting portion (33) located between a front end of the body portion (51) and the driving liquid pressure pump (34) to be able to swing in a direction intersecting with an underwater rotating body axial direction (43); and a plurality of wings (54) configured to project radially from a periphery of the body portion (51).

12 Claims, 18 Drawing Sheets

U.S. PATENT DOCUMENTS

| | | | |
|---|---|---|---|
| 4,722,665 A | 2/1988 | Tyson | |
| 4,849,647 A * | 7/1989 | McKenzie | 290/54 |
| 5,440,176 A | 8/1995 | Haining | |
| 7,633,174 B1 * | 12/2009 | Feiler | 290/43 |
| 2006/0125242 A1 | 6/2006 | Fraenkel | |
| 2006/0152011 A1 | 7/2006 | Fraenkel | |
| 2006/0244267 A1 | 11/2006 | Fraenkel | |

FOREIGN PATENT DOCUMENTS

| | | |
|---|---|---|
| GB | 2459843 A | 11/2009 |
| JP | 3512455 | 9/1960 |
| JP | 5474043 | 6/1979 |
| JP | 54134237 | 10/1979 |
| JP | 55001445 | 1/1980 |
| JP | 56050891 | 5/1981 |
| JP | 57206779 | 12/1982 |
| JP | 57206779 A | 12/1982 |
| JP | 7004336 | 1/1995 |
| JP | 11044288 | 2/1999 |
| JP | 2000054993 | 2/2000 |
| JP | 2002081362 | 3/2002 |
| JP | 2002257023 | 9/2002 |
| JP | 2002332953 | 11/2002 |
| JP | 2004068777 | 4/2004 |
| JP | 2004169564 | 6/2004 |
| WO | 2004055365 A1 | 7/2004 |

OTHER PUBLICATIONS

ISA European Patent Office, Extended European Search Report of EP08850893.02, Jan. 27, 2012, Netherlands, 6 pages.

* cited by examiner

WATER FLOW ELECTRIC POWER GENERATOR

TECHNICAL FIELD

The present invention relates to a water flow electric power generator configured to generate electric power by a water flow, such as a tidal current, a Kuroshio current, or a river current (Note that "water flow electric power generation" in the present description and claims includes all types of electric power generation, such as "tidal current electric power generation", "ocean current electric power generation", and "river current electric power generation", utilizing the water flow.)

BACKGROUND ART

As the electric power generation utilizing natural energy, water power generation and wind power generation have been conventionally carried out. The water power generation typically utilizes the energy of water falling from a dam. In this case, a water-level difference needs to be maintained, and an installation condition is limited. In contrast, each of a tidal current, an ocean current, a comparatively large river, and the like have a large flow of water (hereinafter simply referred to as "water flow"), and there is the idea that electric power can be generated by utilizing the natural energy of the water flow. For example, in the case of the tidal current, there are places where large flows occur by the ebb and flow of the tide, and there is the idea that the electric power generation utilizing the water flow can be carried out at such places.

One example of a technology of generating the electric power by utilizing the tidal current as above is that a hollow supporting rod is provided at a fixed position under the sea, a screw blade configured to rotate by receiving the tidal current of an upper portion of the sea and a screw blade configured to rotate by receiving the tidal current of a lower portion of the sea are provided on the supporting rod, and an electric power generator in a station provided above the sea level is driven by rotational forces of the screw blades rotated by both tidal currents of the upper and lower portions to generate electric power (see Document 1, for example).

Moreover, one example of a technology of generating the electric power by utilizing the water flow is that a stake is planted on a bottom ground of a river, and a floating body including an electric power generating device having a rotating body (screw blade) configured to rotate by receiving naturally falling water flow is provided at the stake so as to be able to move up and down (see Document 2, for example).
Document 1: Japanese Laid-Open Patent Application Publication No. 2002-257023
Document 2: Japanese Laid-Open Patent Application Publication No. 2004-169564

DISCLOSURE OF THE INVENTION

Problems to be Solved by the Invention

In each of the tidal current electric power generator of Document 1 and the water flow electric power generating device of Document 2, the screw blades rotated by the water flow are a plurality of wings arranged radially to extend perpendicular to a center boss. Therefore, floating objects (ropes, pieces of wood, and the like) under the water get entangled with or clash with the screw blades. On this account, it is difficult to continue a stable operation of each of the tidal current electric power generator of Document 1 and the water flow electric power generating device of Document 2.

Moreover, the water flow acting on the screw blade extending in a direction perpendicular to the water flow acts on the screw blade while changing its flow speed and flow direction. Therefore, in order to maintain a stable strength of the screw blade, for example, the weight of the screw blade may increase, and it may become difficult to efficiently generate the electric power.

Further, in Document 2, the electric power generator is provided under the water. Therefore, a structure for water-sealing the electric power generator becomes complex, and it is difficult to stably maintain a water-sealing state for a long period of time.

Here, an object of the present invention is to provide a water flow electric power generator capable of stably generating electric power for a long period of time by efficiently obtaining a rotational power from an underwater rotating body configured to stably rotate by receiving a water flow.

Means for Solving the Problems

To achieve the above object, the present invention includes an underwater rotating body configured to rotate by a water flow, a holding portion configured to hold a front end of the underwater rotating body at a predetermined position under water, a power transmission unit configured to transfer a rotational power of the underwater rotating body held by the holding portion to above a water surface, and an electric power generator disposed above the water surface to be driven by the power transferred by the power transmission unit, wherein the underwater rotating body includes a body portion having a streamline shape from a front end thereof to a rear end thereof, a supporting portion located between a front end of the body portion and the holding portion to be able to swing in a direction intersecting with an underwater rotating body axial direction, and a plurality of wings configured to project radially from a periphery of the body portion. The "streamline shape" in the present description and claims denotes a shape, such as a "rugby ball shape", an "ellipse shape", or a "pod shape", whose front end and rear end are small in diameter and whose center portion is large in diameter. Moreover, the "electric power generator" includes a "turbine electric power generator". With this, the underwater rotating body rotates such that the wings provided around the streamline-shaped body portion receive the water flow, and the underwater rotating body rotates while swinging in a direction intersecting with an underwater rotating body axial direction by the supporting portion of the front end. Then, the rotational power of the underwater rotating body is transferred through the power transmission unit to the electric power generator disposed above the water surface. Thus, the electric power generator generates the electric power. Therefore, the floating objects under the water are prevented from getting entangled with the underwater rotating body, and the underwater rotating body absorbs the shock generated when the floating objects hit the underwater rotating body. Thus, the electric power can be efficiently and stably generated for a long period of time.

Moreover, the body portion of the underwater rotating body may be hollow and provided with a communication hole which is communicated with outside such that the water flows therethrough into the body portion. With this, the posture of the underwater rotating body under the water can be stabilized by introducing the water to the hollow inner portion of the underwater rotating body.

Further, the communication hole may be formed at each of a front portion of the body portion and a rear end of the body portion. With this, the posture of the underwater rotating body rotating can be stabilized such that the water having flowed into the underwater rotating body through the front portion of the body portion is discharged through the rear end.

Moreover, a gas injection mechanism configured to inject a gas into the body portion to cause the underwater rotating body to float may be included in the body portion of the underwater rotating body. With this, the underwater rotating body can be caused to quickly float by injecting the gas into the body portion by the gas injection mechanism.

Further, a hollow portion may be formed inside the wing, and a floating gas may be put in the hollow portion. With this, even if the underwater rotating body comes off the holding portion, it automatically floats. Therefore, the underwater rotating body can be easily recovered.

Moreover, the wing may be formed around an outer periphery of the body portion while inclining from a coupled base portion of the wing coupled to the body portion toward a rear side of the wing, and a rear end of the wing of the underwater rotating body may extend to the coupled base portion of an adjacent wing, in a front view. With this, wide wing surfaces can be formed around the body portion by the wings, and the underwater rotating body can be stably rotated such that the wing surfaces receive the water flow.

Further, the power transmission unit may be constituted by a liquid pressure drive mechanism including a driving liquid pressure pump configured to be driven by the underwater rotating body and a driven liquid pressure pump configured to be driven by a liquid supplied by the driving liquid pressure pump and cause the electric power generator to rotate. The "liquid" used in the "liquid pressure pump" in the present description and claims is, for example, oil or a liquid having a similar viscosity to oil. With this, the rotational power of the underwater rotating body is converted into the flow rate of the liquid, and the flow rate is transferred to above the water surface and converted into the rotational power above the water surface to cause the electric power generator to rotate. Therefore, the power transmission from a plurality of portions under the water to above the water surface can be carried out comparatively easily.

Moreover, the driving liquid pressure pump may be a low-speed rotation pump, and the driven liquid pressure pump may be a high-speed rotation pump. With this, in a case where a liquid circulating hose on the driving liquid pressure pump side has a large diameter, and a liquid circulating hose on the driven liquid pressure pump side has a small diameter, based on Bernoulli's theorem, the driven liquid pressure pump is rotated at high speed by the liquid discharged from the driving liquid pressure pump driven by the underwater rotating body at low speed. Thus, the electric power generator driven by the driven liquid pressure pump rotating at high speed can generate high-output electric power.

Further, the power transmission unit may be constituted by a speed increasing drive mechanism including a driving shaft configured to be driven by the underwater rotating body and a driven shaft coupled to the driving shaft to cause the electric power generator to rotate. With this, secure power transmission with less power transmission loss can be carried out.

Moreover, the power transmission unit may be constituted by a flexible shaft drive mechanism including a flexible shaft configured to be driven by the underwater rotating body and a speed increasing drive mechanism coupled to the flexible shaft to cause the electric power generator to rotate. With this, a configuration for causing the underwater rotating body to rotate to drive the electric power generator can be assembled comparatively easily.

Further, in a configuration in which the power transmission unit is the liquid pressure drive mechanism or the speed increasing drive mechanism, the holding portion may include a frame fixed to a water bottom, a device arranging portion located at an upper portion of the frame to allow the electric power generator to be disposed above the water surface, and a lifting unit configured to cause the underwater rotating body and the power transmission unit to move up and down along the frame. With this, the underwater rotating body can move up and down to a position where the water flow is suitable for the electric power generation. Thus, the electric power generation can be carried out more efficiently.

In addition, in a case where the lifting unit is able to cause a plurality of the underwater rotating bodies to move up and down along the frame at predetermined intervals, the plurality of the underwater rotating bodies can respectively move up and down to the positions where the water flow is suitable for the electric power generation. Thus, the electric power generation can be carried out more efficiently by the plurality of the underwater rotating bodies.

Further, in a configuration in which the power transmission unit is the flexible shaft drive mechanism, the holding portion may include a floating body configured to float on the water surface and an anchor configured to hold the floating body at a predetermined position. With this, the water flow electric power generator can be placed at a predetermined position comparatively easily without major construction work.

Effects of the Invention

By the above-explained configurations, the present invention can utilize the water flow to stably obtain the rotational power for a long period of time, thereby efficiently generating electric power.

Figure 1:
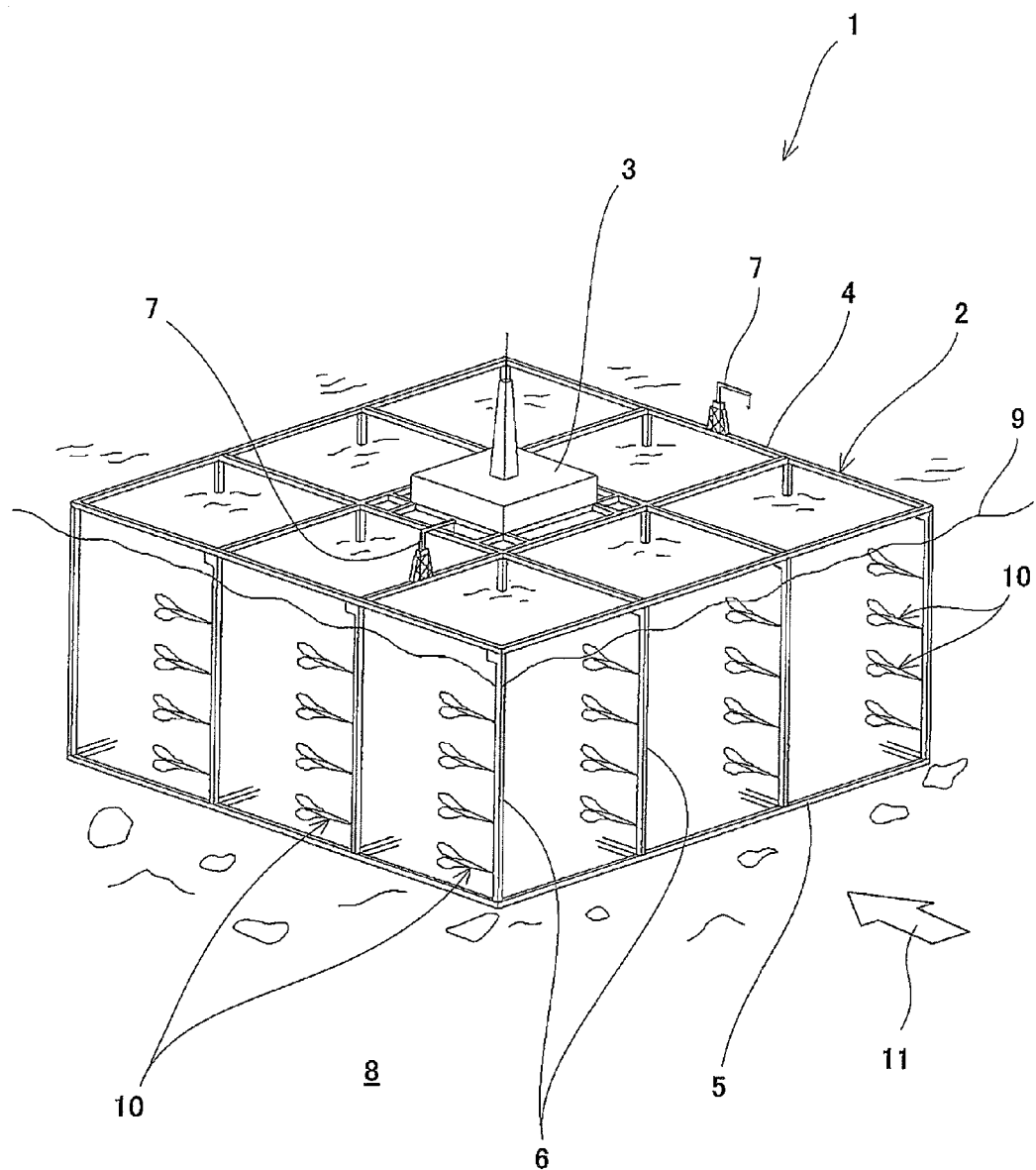
FIG. 1 is a perspective view showing a water flow electric power generator according to Embodiment 1 of the present invention.

EXPLANATION OF REFERENCE NUMBERS 1 water flow electric power generator
2 frame
3 device arranging portion
6 vertical member
9 water surface
10 underwater rotating body
11 water flow
13 body portion
14 wing
15 supporting portion
20 electric power generator
23 power transmission unit
24 holding portion
30 water flow electric power generator
31 vertical member
32 underwater rotating body
33 supporting portion
34 driving liquid pressure pump
35 liquid circulating hose
36 roll-up unit
37 liquid circulating hose
38 driven liquid pressure pump
39 turbine electric power generator
40 power transmission unit
41 wheel
42 downstream side wall
45 universal joint mechanism
51 body portion
52 front end
53 rear end
54 wing
55 communication hole
60 water flow electric power generator
63 floating body (buoy)
67 supporting portion
71 electric power generator
74 power transmission unit
80 water flow electric power generator
81 frame
84 vertical member
85 device arranging portion
86 electric power generator
87 supporting tube
88 outer tube
89 inner tube
98 supporting portion
110 water flow electric power generator
113 device arranging portion
114 electric power generator
119 flexible shaft
123 supporting portion
130 underwater rotating body
131 body portion
132 carbon dioxide bomb
140, 150 underwater rotating body
141, 151 wing
151 wing

BEST MODE FOR CARRYING OUT THE INVENTION

Figure 2:
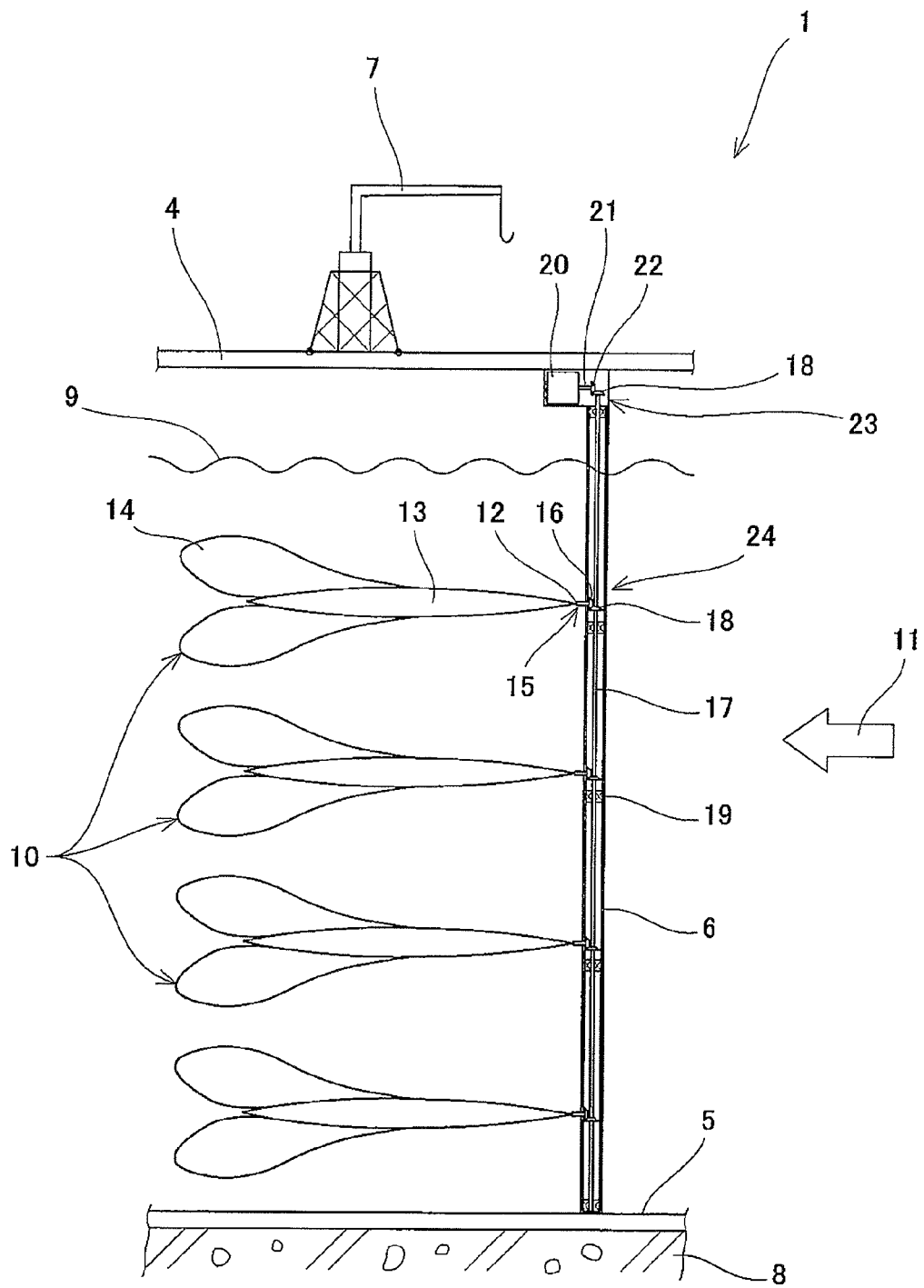
FIG. 2 is a partial enlarged side view of the water flow electric power generator shown in FIG. 1.

Hereinafter, one embodiment of the present invention will be explained based on the drawings. FIG. 1 is a perspective view showing a water flow electric power generator according to Embodiment 1 of the present invention. FIG. 2 is a partially enlarged side view of the water flow electric power generator shown in FIG. 1. Embodiment 1 is an example in which electric power is generated by ocean currents or rivers, and the electric power is generated by a unidirectional water flow.

As shown in FIG. 1, a water flow electric power generator 1 of the present embodiment includes a scaffold-like rectangular frame 2 and a device arranging portion 3 disposed at a center of an upper portion of the frame 2. The frame 2 is formed to have a rectangular shape by assembling a plurality of upper horizontal members 4 provided at an upper end, a plurality of lower horizontal members 5 provided at a lower end, and a plurality of vertical members 6 (columns) provided to couple the upper horizontal members 4 and the lower horizontal members 5. A traveling crane 7 configured to travel on the upper horizontal members 4 is disposed on upper portions of the upper horizontal members 4. A lower end of the frame 2 is fixed to a water bottom 8. The frame 2 is formed to have such a size that the device arranging portion 3 is located above a water surface 9. For example, the frame 2 is formed in a rectangular shape having a width of about 150 meters and a height of about 100 meters.

A plurality of underwater rotating bodies 10 are provided at the vertical members 6 of the frame 2. In the present embodiment, four underwater rotating bodies 10 are provided for each vertical member 6. The underwater rotating body 10 receives a water flow 11 from a direction indicated by an arrow of FIG. 1.

As shown in FIG. 2, the underwater rotating body 10 includes a streamline-shaped body portion 13 having a front end 12 rotatably held by the vertical member 6. A plurality of wings 14 are radially arranged around the body portion 13. In this example, three wings 14 are radially arranged at regular intervals, and each wing 14 is twisted at a predetermined twisting angle from an axially center portion of the body portion 13 to a rear end of the body portion 13. In a state where a supporting portion 15 of the underwater rotating body 10 is supported in a horizontal direction from the vertical member 6, the body portion 13 can swing in a direction intersecting with the underwater rotating body axial direction. The supporting portion 15 adopts a universal joint mechanism 45 (having the same structure as in FIG. 4 described below). With this, with the front end 12 of the underwater rotating body 10 held at a predetermined position of the vertical member 6, the rear end of the underwater rotating body 10 swings along the water flow 11 as if the body portion 13 and the wings 14 swim under water while integrally rotating. The underwater rotating body 10 used herein is formed to have a length of about 20 meters and a rotation diameter of about 8 meters. Moreover, the material of the underwater rotating body 10 used herein is a resin, such as fiber reinforced plastic (FRP) or carbon fiber reinforced plastic (CFRP), or a metal. In a case where the underwater rotating body 10 is made of a titanium alloy, it does not rust even under water and can be used semipermanently.

A bevel gear 16 configured to rotate integrally with the underwater rotating body 10 is provided at a front end of the supporting portion 15 of the underwater rotating body 10. The bevel gear 16 meshes with a bevel gear 18 of a power transmitting shaft 17 provided to extend vertically inside the vertical member 6. The power transmitting shaft 17 is rotatably supported by the vertical member 6 via bearings 19. The bevel gear 18 is provided at an upper end of the power transmitting shaft 17. The bevel gear 18 meshes with a bevel gear 22 of a shaft 21 of an electric power generator 20 provided above the water surface 9 in a horizontal direction. These components constitute a power transmission unit 23. A configuration for holding the bevel gear 16 of the front end of the supporting portion 15 at a predetermined position by the bevel gear 18 is a holding portion 24. It is preferable that the electric power generator 20 be a low-revolution, high-output, multipolar synchronous electric power generator. For example, an electric power generator having a power generation capacity of about 2,000 kW is preferable.

In accordance with the water flow electric power generator 1 configured as above, a rotational power is obtained by the underwater rotating body 10 rotating while swinging as if the underwater rotating body 10 swims with the water flow 11. Next, the rotational power is transferred through the power transmitting shaft 17 to above the water surface 9. Then, the electric power generator 20 is rotated by the power transmitting shaft 17. Thus, the electric power generator 20 generates the electric power. For example, in a case where each of the underwater rotating bodies 10 is formed as above to have a length of about 20 meters and a rotation diameter of about 8 meters, and the water flow electric power generator 1 including the underwater rotating bodies 10 is placed in the water flow 11 of 3 knots, each of the underwater rotating bodies 10 can generate about 500 kW of electric power.

Therefore, for example, in a case where one unit including 48 underwater rotating bodies 10 is placed under the sea of the water flow of 3 knots as the water flow electric power generator 1 including a plurality of the underwater rotating bodies 10 as shown in FIG. 1, each of the underwater rotating bodies 10 generates about 500 kW of electric power as described above, so that one unit can generate about 24,000 kW of electric power. Therefore, if 51 units are placed under the sea, they can generate the electric power of 1,224 MW corresponding to the electric power generated by one large-scale nuclear power plant.

Figure 3:
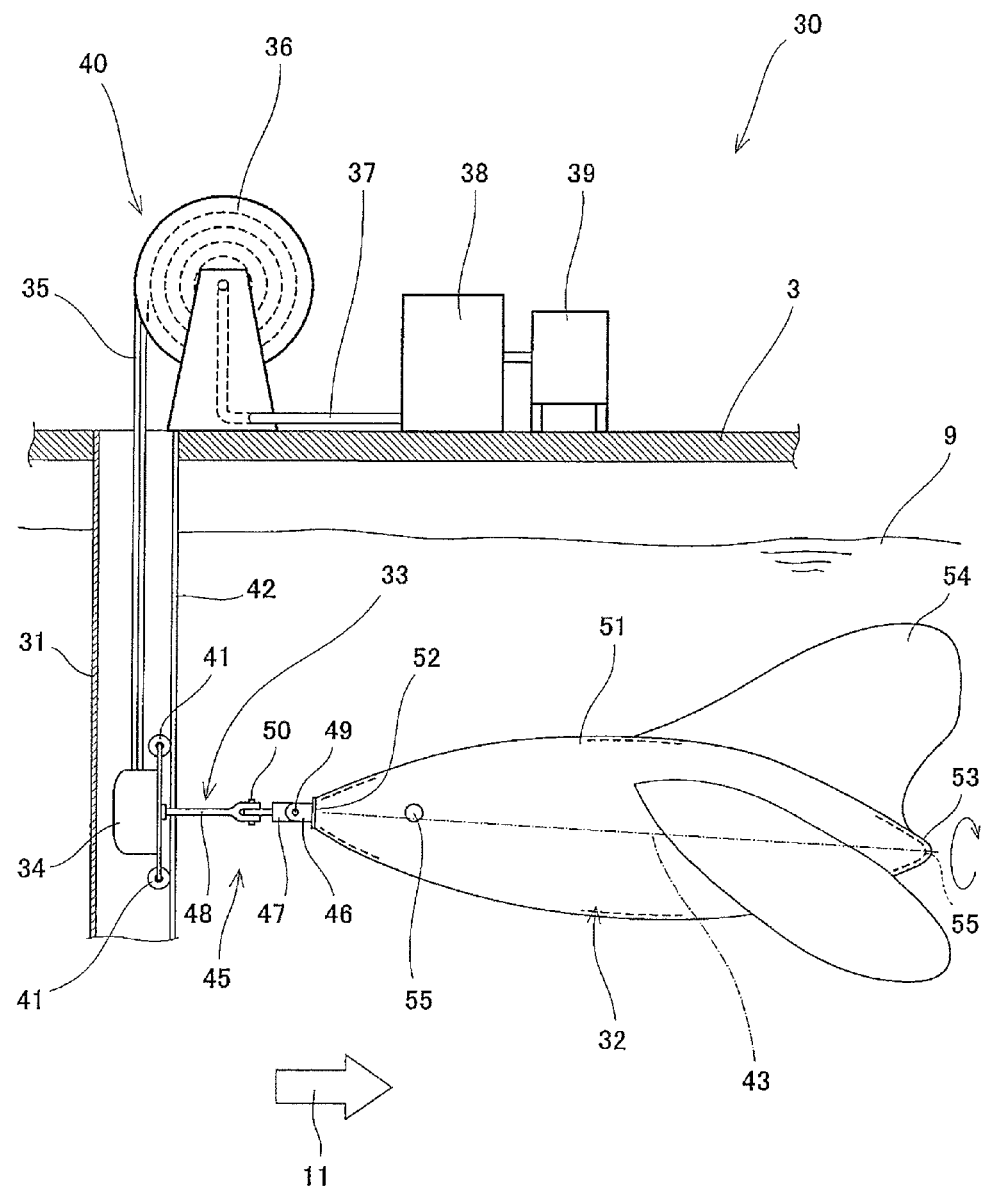
FIG. 3 is an enlarged side view showing the water flow electric power generator according to Embodiment 2 of the present invention.
Figure 4:
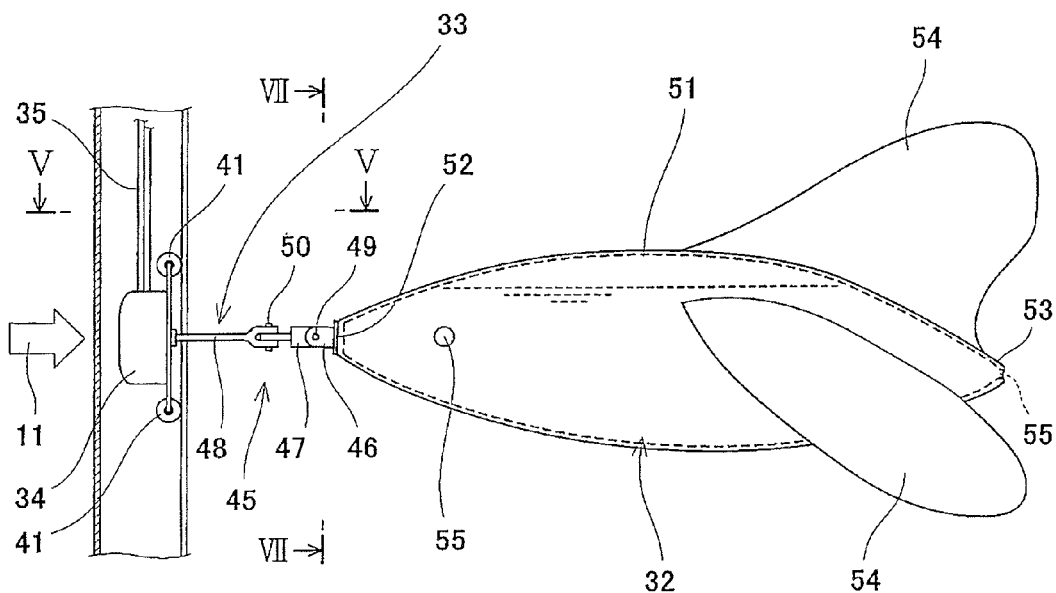
FIG. 4 is a partial cross-sectional and partially enlarged side view of the water flow electric power generator shown in FIG. 3.
Figure 5:
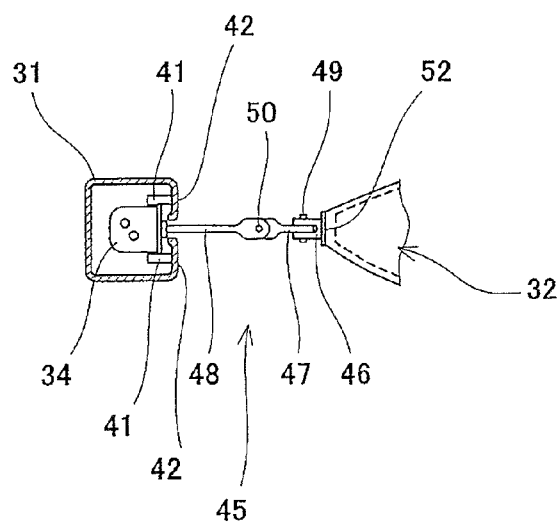
FIG. 5 is a view of a cross section taken along line V-V of FIG. 4.
Figure 6:
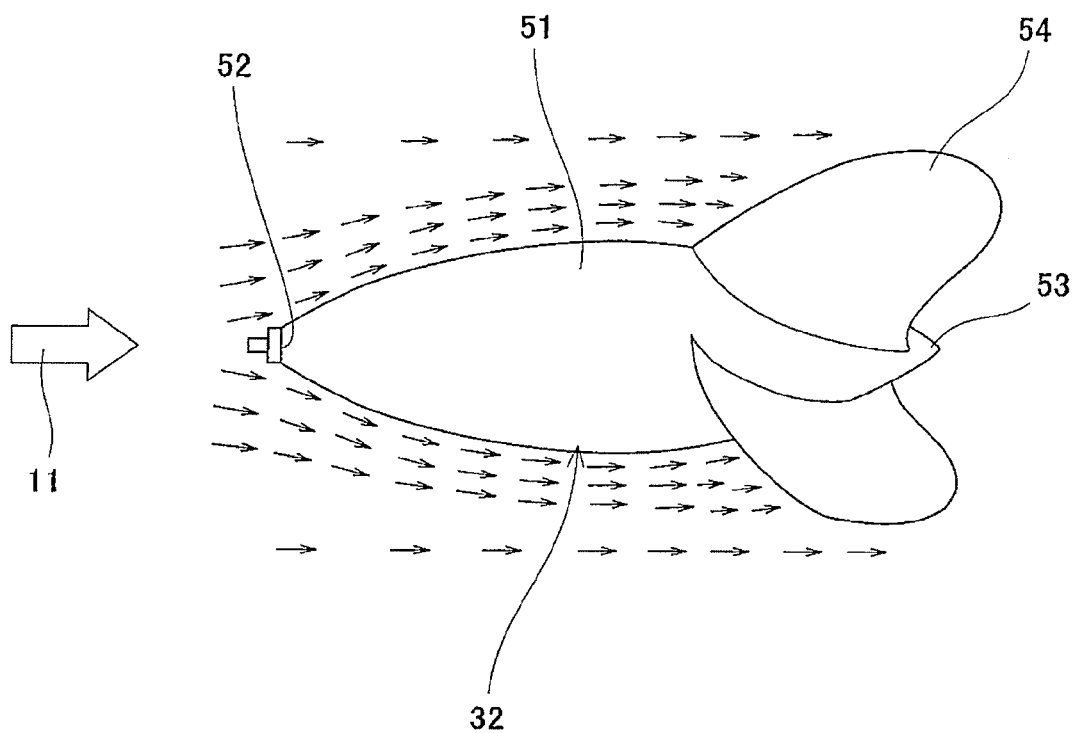
FIG. 6 is a side view schematically showing the flow of a fluid around an underwater rotating body of the water flow electric power generator shown in FIG. 3.
Figure 7:
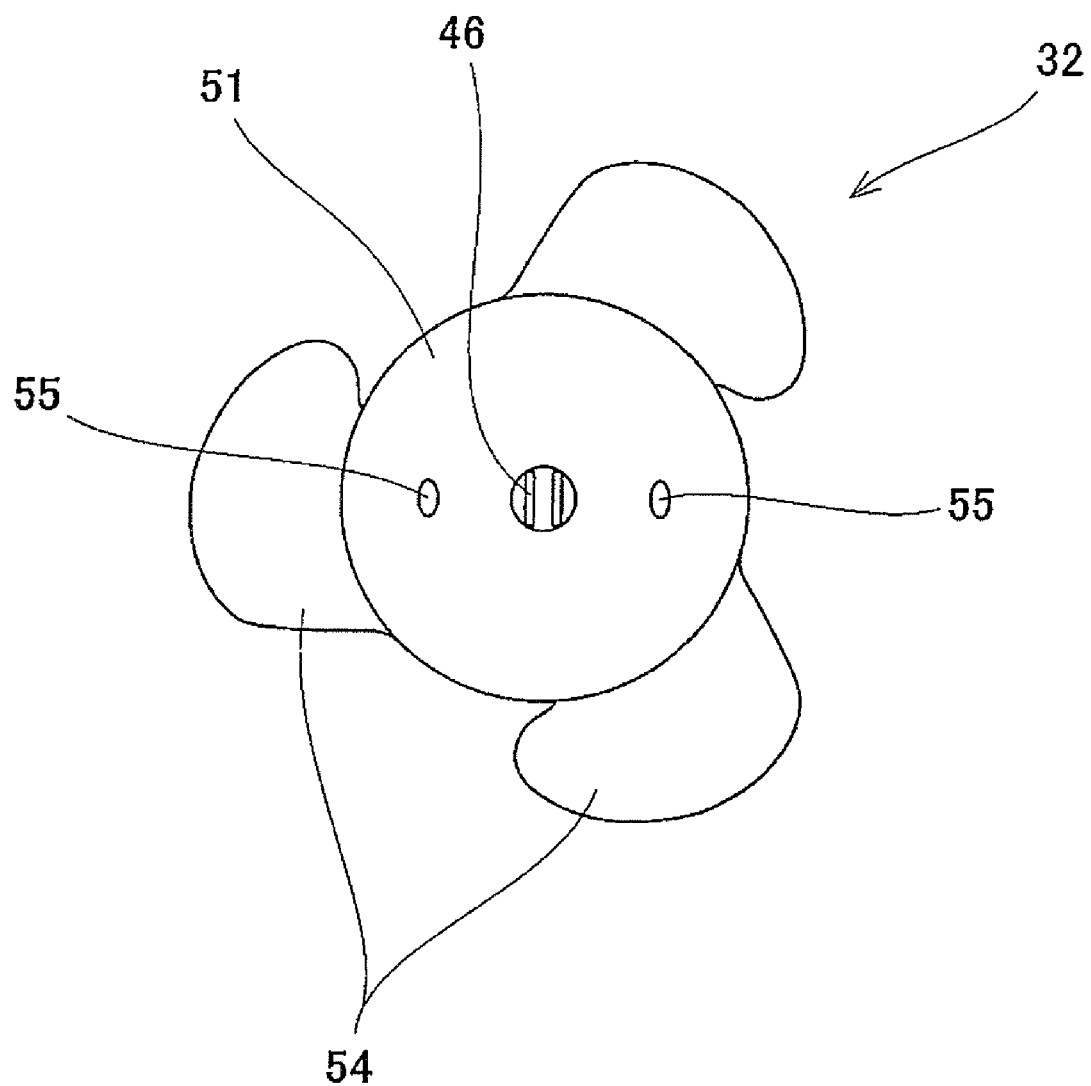
FIG. 7 is a diagram when viewed from a direction indicated by arrows VII-VII of FIG. 4.

FIG. 3 is an enlarged side view showing the water flow electric power generator according to Embodiment 2 of the present invention. FIG. 4 is a partial cross-sectional and partially enlarged side view of the water flow electric power generator shown in FIG. 3. FIG. 5 is a view of a cross section taken along line V-V of FIG. 4. FIG. 6 is a side view schematically showing the flow of a fluid around the underwater rotating body of the water flow electric power generator shown in FIG. 3. FIG. 7 is a diagram when viewed from a direction indicated by arrows VII-VII of FIG. 4. In a water flow electric power generator 30 according to Embodiment 2, a liquid pressure drive mechanism is used instead of the power transmission unit 23 having a gear drive mechanism in Embodiment 1. The same reference numbers are used for the same components as in Embodiment 1, and detailed explanations thereof are omitted.

As shown in FIG. 3, in the water flow electric power generator 30 of the present embodiment, a driving liquid pressure pump 34 is provided inside a vertical member 31 (column) provided to extend downward from the device arranging portion 3, and a supporting portion 33 of an underwater rotating body 32 is coupled to the driving liquid pressure pump 34. With this, when the underwater rotating body 32 rotates, the supporting portion 33 of the underwater rotating body 32 causes the driving liquid pressure pump 34 to rotate. Thus, the power can be obtained.

A liquid circulating hose 35 through which a liquid circulates to the driving liquid pressure pump 34 extends through the inside of the vertical member 31 to above the device arranging portion 3. The liquid circulating hose 35 is rolled up by a roll-up unit 36 disposed on the device arranging portion 3. Two liquid circulating hoses 35 are provided to circulate the liquid. A driven liquid pressure pump 38 configured to be rotated by the liquid supplied from the driving liquid pressure pump 34 and a turbine electric power generator 39 configured to be rotated by the driven liquid pressure pump 38 are disposed on the device arranging portion 3. The roll-up unit 36 and the driven liquid pressure pump 38 are connected to each other by a liquid circulating hose 37. The driving liquid pressure pump 34, the driven liquid pressure pump 38, and the liquid circulating hoses 35 and 37 constitute a power transmission unit 40.

An oil pressure pump or the like is used as each of the liquid pressure pumps 34 and 38. However, "oil" cannot be leaked to the sea under the Japanese law entitled, "Law Relating to the Prevention of Marine Pollution and Maritime Disaster". Therefore, it is preferable to use a liquid (barium, for example) having a viscosity similar to the viscosity of the oil.

As shown in FIG. 4, the driving liquid pressure pump 34 can move up and down along a downstream side wall 42 of the vertical member 31 by wheels 41 provided on an upper side and lower side of the driving liquid pressure pump 34. With this, the underwater rotating body 32 can move up and down along the vertical member 31 integrally with the driving liquid pressure pump 34.

As shown in FIG. 5, four wheels 41 are provided on both sides of the driving liquid pressure pump 34 so as to be spaced apart from each other in a vertical direction. By these four wheels 41, the underwater rotating body 32 and the driving liquid pressure pump 34 rotatably holding the underwater rotating body 32 integrally move up and down along the downstream side wall 42 formed in the vertical member 31 as a rail. In the present embodiment, the driving liquid pressure pump 34 is a holding portion of the underwater rotating body 32.

Moreover, a hose having a predetermined hardness is used as the liquid circulating hose 35. With this, as shown in FIG. 3, the underwater rotating body 32 can move up integrally with the liquid circulating hose 35 by rolling up the liquid circulating hose 35 by the roll-up unit 36 disposed on the device arranging portion 3 placed above the water surface 9. In the present embodiment, when causing the underwater rotating body 32 to move down, the underwater rotating body 32 is caused to move down by the weight of the driving liquid pressure pump 34 itself, and the like. When causing the underwater rotating body 32 to move up, the underwater rotating body 32 is caused to move up integrally with the liquid circulating hose 35 by rolling up the liquid circulating hose 35 by the roll-up unit 36. As a method for causing the underwater rotating body 32 to move up and down, a traveling crane 7 shown in FIG. 2 may be provided, and the underwater rotating body 32 may be caused to move up and down by a strapdown wire of the traveling crane 7.

Further, the turbine electric power generator 39 may generate the electric power such that a low-speed rotation liquid pressure pump is used as the driving liquid pressure pump 34, a high-speed rotation fluid pump is used as the driven liquid pressure pump 38, the large-diameter liquid circulating hose 35 is used on the driving liquid pressure pump 34 side, the small-diameter liquid circulating hose 37 is used on the driven liquid pressure pump 38 side, a liquid pressure of a low-speed rotation (30 to 40 rpm, for example) and a high torque is obtained by the underwater rotating body 32 on the driving liquid pressure pump 34 side, this liquid pressure is converted into a liquid pressure of a high-speed rotation (1,000 rpm, for example) and a low-torque on the driven liquid pressure pump 38 side, the driven liquid pressure pump 38 is rotated at high speed by the converted liquid pressure, and the turbine electric power generator 39 is rotated at high speed by the driven liquid pressure pump 38.

To be specific, the liquid circulating hoses 35 and 37 are formed to be different in diameter from each other, i.e., the liquid circulating hose 35 on the driving liquid pressure pump 34 side has a large diameter whereas the liquid circulating hose 37 on the driven liquid pressure pump 38 side has a small diameter. With this, based on Bernoulli's theorem, a high-speed rotational power can be obtained on the driven liquid pressure pump 38 side of the turbine electric power generator 39, and the turbine electric power generator 39 can be rotated at high speed by the rotational power to stably generate high-output electric power.

Further, the supporting portion 33 configured to support the underwater rotating body 32 on a water flow downstream side (right side in the drawing) of the driving liquid pressure pump 34 adopts the universal joint mechanism 45. The universal joint mechanism 45 is configured such that a front end coupling member 46, an intermediate coupling member 47, and a pump coupling shaft 48 (driving shaft), which are provided at a front end 52 of a body portion 51 of the underwater rotating body 32, are coupled to one another by pins 49 and 50. By these two pins 49 and 50 arranged to make an angle of 90 degrees, the underwater rotating body 32 can swing in a direction intersecting with an underwater rotating body axial direction 43 while rotating. Therefore, with the front end of the supporting portion 33 held at a predetermined position by the driving liquid pressure pump 34, the underwater rotating body 32 held by the universal joint mechanism 45 rotates while a rear end side thereof swings along the water flow.

In addition, the underwater rotating body 32 is formed to be hollow and is held by the universal joint mechanism 45. With this, even if floating objects flowing through the water contact the underwater rotating body 32, the underwater rotating body 32 readily swings to prevent the floating objects from getting entangled therewith and absorb the shock. Thus, the electric power generation can be stably carried out for a long period of time.

Moreover, as shown in FIG. 6, the underwater rotating body 32 is formed to have such a streamline shape that a flow-direction center portion of the body portion 51 is large in diameter, and each of the front end 52 and a rear end 53 is small in diameter. With this, the flow speed of the water flow 11 can be increased in the vicinity of the center of the body portion 51, and the water flows toward the wings 54. Therefore, the stable rotational power can be obtained even by the underwater rotating body 32 which is small in length. In addition, by increasing the flow speed of the water flow 11, algae, ropes, and the like under the water can be prevented from getting entangled with the wings 54.

Further, as shown in FIG. 7, the body portion 51 of the underwater rotating body 32 of the present embodiment has communication holes 55 through which the water can flow into a hollow inner portion of the body portion 51. The communication holes 55 are formed at a front portion of the body portion 51 and the rear end 53 (FIG. 4) of the body portion 51. The water having flowed through the communication holes 55 at the front portion is discharged through the communication hole 55 at the rear end. As above, by allowing the water to flow into the body portion 51, the underwater rotating body 32 does not significantly float or sink even if a water depth of the underwater rotating body 32 changes. Thus, the underwater rotating body 32 stably rotates.

The water flow electric power generator 30 of Embodiment 2 can generate the electric power such that: the supporting portion 33 causes the driving liquid pressure pump 34 to rotate by the rotation of the underwater rotating body 32, the pressure liquid discharged from the driving liquid pressure pump 34 is supplied through the liquid circulating hose 35 to the driven liquid pressure pump 38 provided above the water surface 9 to drive the driven liquid pressure pump 38, and the driven liquid pressure pump 38 causes the turbine electric power generator 39 to rotate.

Therefore, in accordance with the water flow electric power generator 30, for example, even in a case where the electric power is generated by utilizing a water flow 11 including upper and lower streams of different flow speeds, the driven liquid pressure pump 38 is rotated by the liquid pressure discharged by liquid pressure pumps 34, which are driven by each of the underwater rotating bodies 32. Therefore, the turbine electric power generator 39 can generate electric power from rotation of the driven liquid pressure pump 38, with the difference in the rotations of each of the underwater rotating bodies 32 being absorbed, and as a result electric power can be stably generated by a water flow 11 including different flow speeds.

To be specific, the rotational energy of the underwater rotating body 32 is not mechanically transferred but is converted into a liquid pressure energy, and the liquid pressure energy is transferred to above the water. Then, the liquid pressure energy is converted into rotational energy again above the water, and the turbine electric power generator 39 is rotated by the rotational energy. Therefore, the turbine electric power generator 39 can be stably driven by the power obtained from the underwater rotating bodies 32 which are different from one another in a number of rotations.

Moreover, in the case of the water flow electric power generator 30 of the present embodiment, the underwater rotating body 32 can easily move up and down to any position by causing the driving liquid pressure pump 34 to move up and down. Therefore, an operation of placing the underwater rotating body 32 at a position (water depth) where the water flow is high in speed can be easily carried out.

Figure 8:
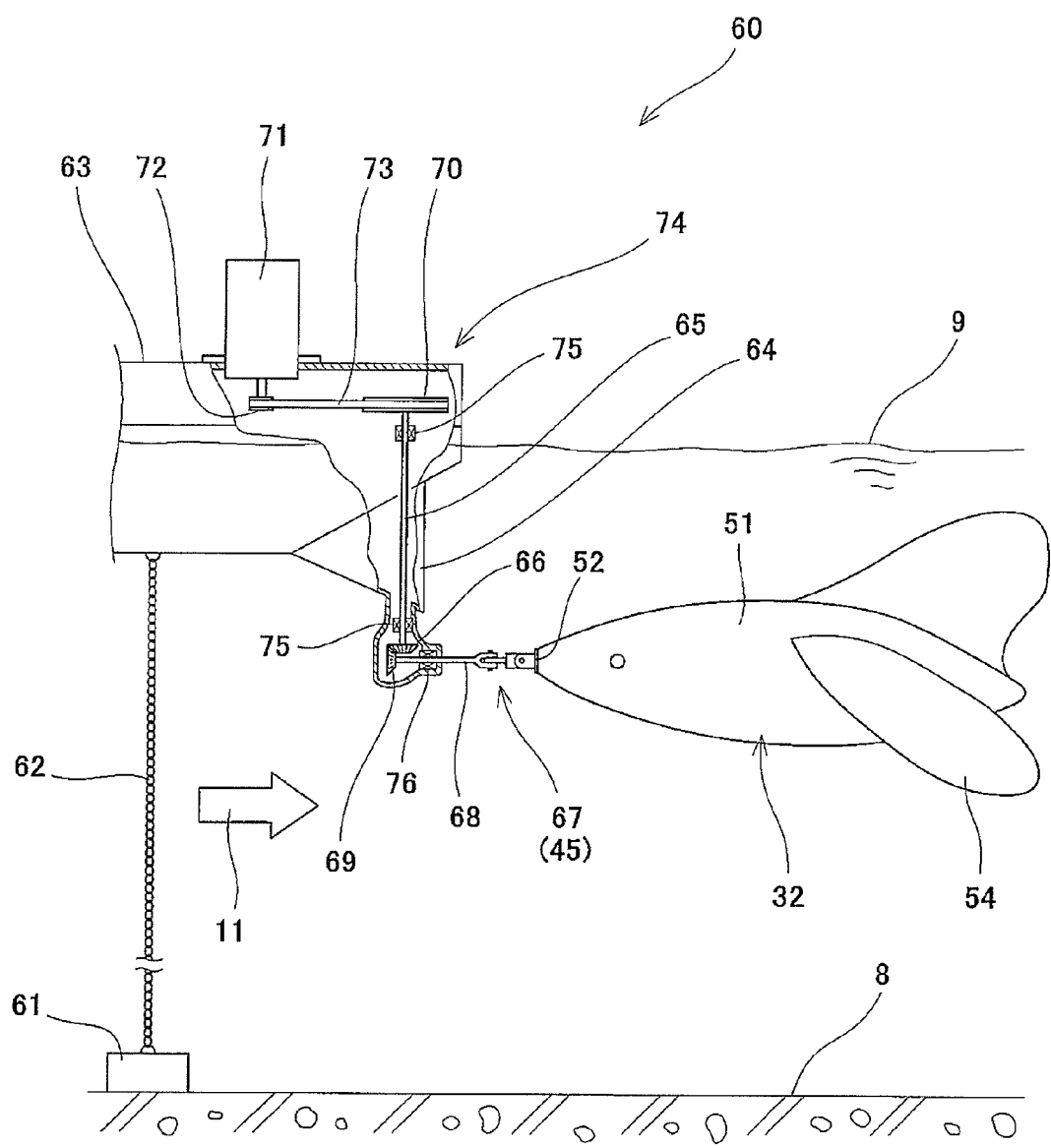
FIG. 8 is a side view showing the water flow electric power generator according to Embodiment 3 of the present invention.

FIG. 8 is a side view showing the water flow electric power generator according to Embodiment 3 of the present invention. Instead of the frame 2 of Embodiment 1, a water flow electric power generator 60 according to Embodiment 3 uses a floating body 63 (hereinafter referred to as "buoy") floating on the water surface 9 by a chain 62 held in a certain position by an anchor 61. Embodiment 3 is an example in which the electric power is generated by the tidal current and can be generated by the water flow of any direction. In the present embodiment, the same reference numbers are used for the same components as in Embodiment 2, and detailed explanations thereof are omitted. Moreover, the present embodiment will be explained using the underwater rotating body 32 of Embodiment 2.

As shown in FIG. 8, the water flow electric power generator 60 of the present embodiment includes a current plate 64 extending downward from one end of the buoy 63 floating on the water surface 9. A driven shaft 65 rotatably supported by a bearing 75 is provided inside the current plate 64. The current plate 64 is provided at one side away from the chain 62, fixed to a lower surface of the buoy 63. Since the chain 62 coupled to the anchor 61 is located upstream of the current plate 64 in the water flow 11, the current plate 64 is always located downstream of the chain 62 in the water flow 11.

A bevel gear 66 provided at a lower end of the driven shaft 65 meshes with a bevel gear 69 of a driving shaft 68 provided at a supporting portion 67 of the underwater rotating body 32. The driving shaft 68 is rotatably supported by a bearing 76. In the present embodiment, the supporting portion 67 adopts the universal joint mechanism 45. With this, the bevel gear 69 of the driving shaft 68 is rotated by the rotation of the underwater rotating body 32, and the driven shaft 65 is rotated by the bevel gear 69 via the bevel gear 66. An upper portion of the driven shaft 65 is coupled to a driving pulley 70 provided above the water. An electric power generator 71 is disposed on the buoy 63, and a driven pulley 72 provided at a shaft of the electric power generator 71 is driven by the driving pulley 70 via a belt 73. The driving pulley 70 is formed to have a large diameter, and the driven pulley 72 is formed to have a small diameter. Therefore, by the difference between the diameters of the pulleys 70 and 72, the rotation of the driven pulley 72 is increased in speed, so that the electric power generator 71 is rotated at high speed. Thus, the electric power is generated. Such configuration for causing the electric power generator 71 to rotate is a power transmission unit 74, i.e., a speed increasing drive mechanism.

In accordance with the water flow electric power generator 60, in a case where the buoy 63 is fixed to an arbitrary position, for example, even if the water flow 11 changes its direction as in the case of the tidal current electric power generation, the underwater rotating body 32 rotates at 360 degrees such that the front end 52 thereof always face upstream. Therefore, the underwater rotating body 32 is always rotated by the water flow 11 to cause the electric power generator 71 to rotate. Thus, electric power can be generated. In addition, in accordance with the water flow electric power generator 60, the underwater rotating body 32 rotates while swinging as if the underwater rotating body 32 swims along the water flow 11 by the universal joint mechanism 45 of the supporting portion 67. Therefore, floating objects and the like are prevented from getting entangled with the underwater rotating body 32, and the underwater rotating body 32 absorbs the shock. Thus, electric power can be generated in accordance with the water flow 11.

Figure 9:
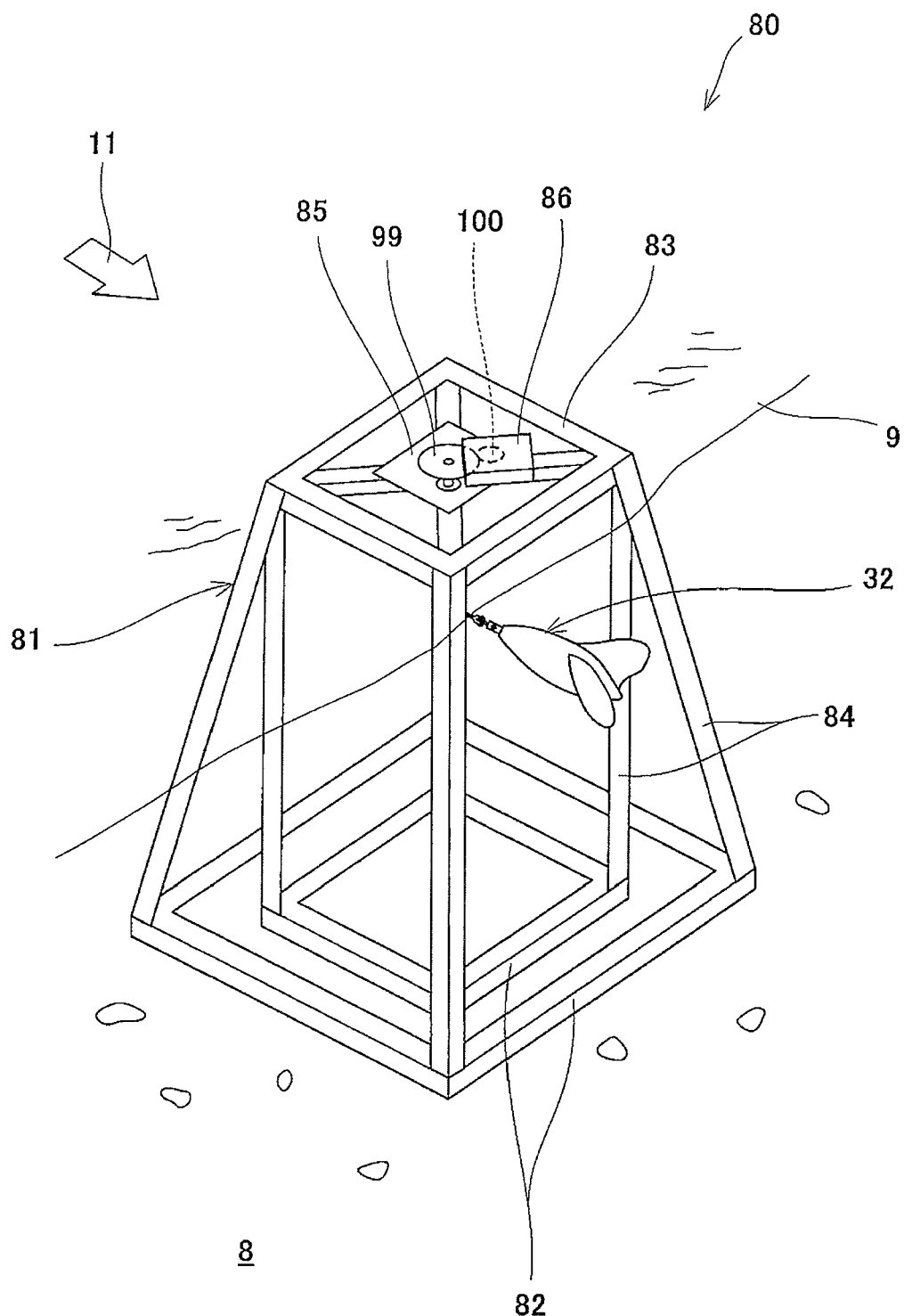
FIG. 9 is a perspective view showing the water flow electric power generator according to Embodiment 4 of the present invention.
Figure 10:
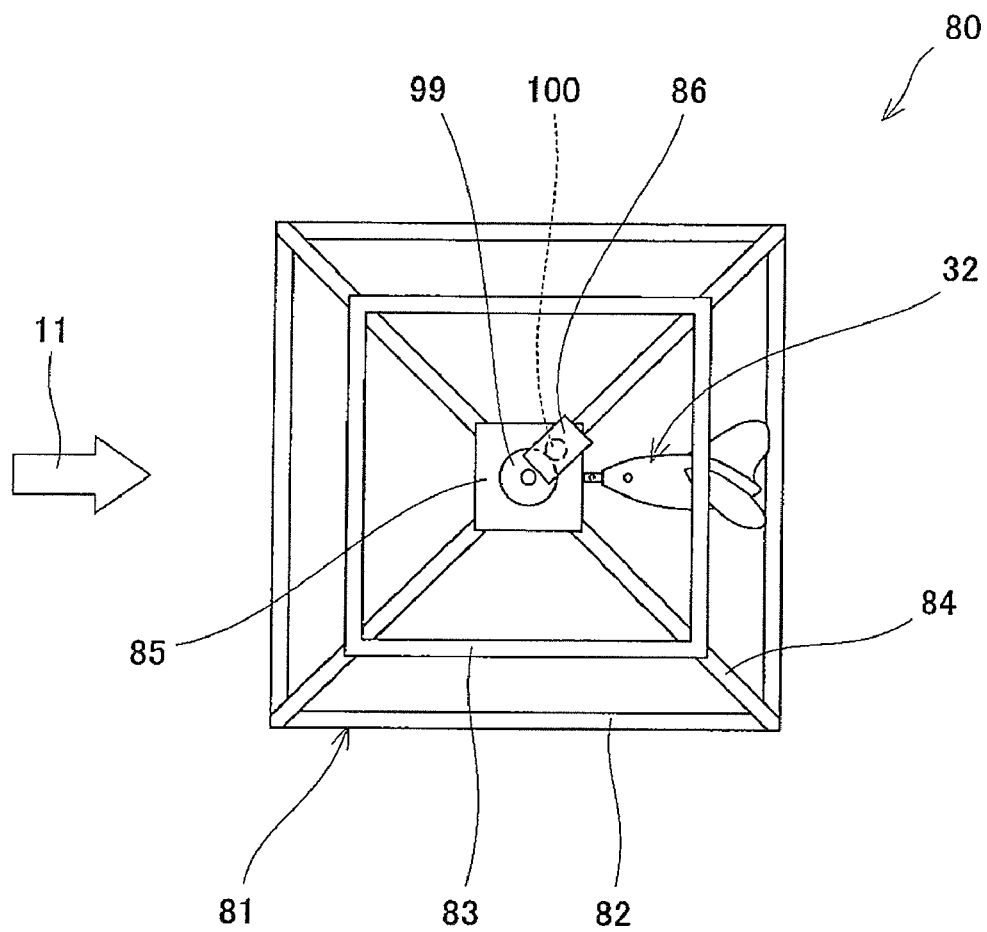
FIG. 10 is a plan view of the water flow electric power generator shown in FIG. 9.
Figure 11:
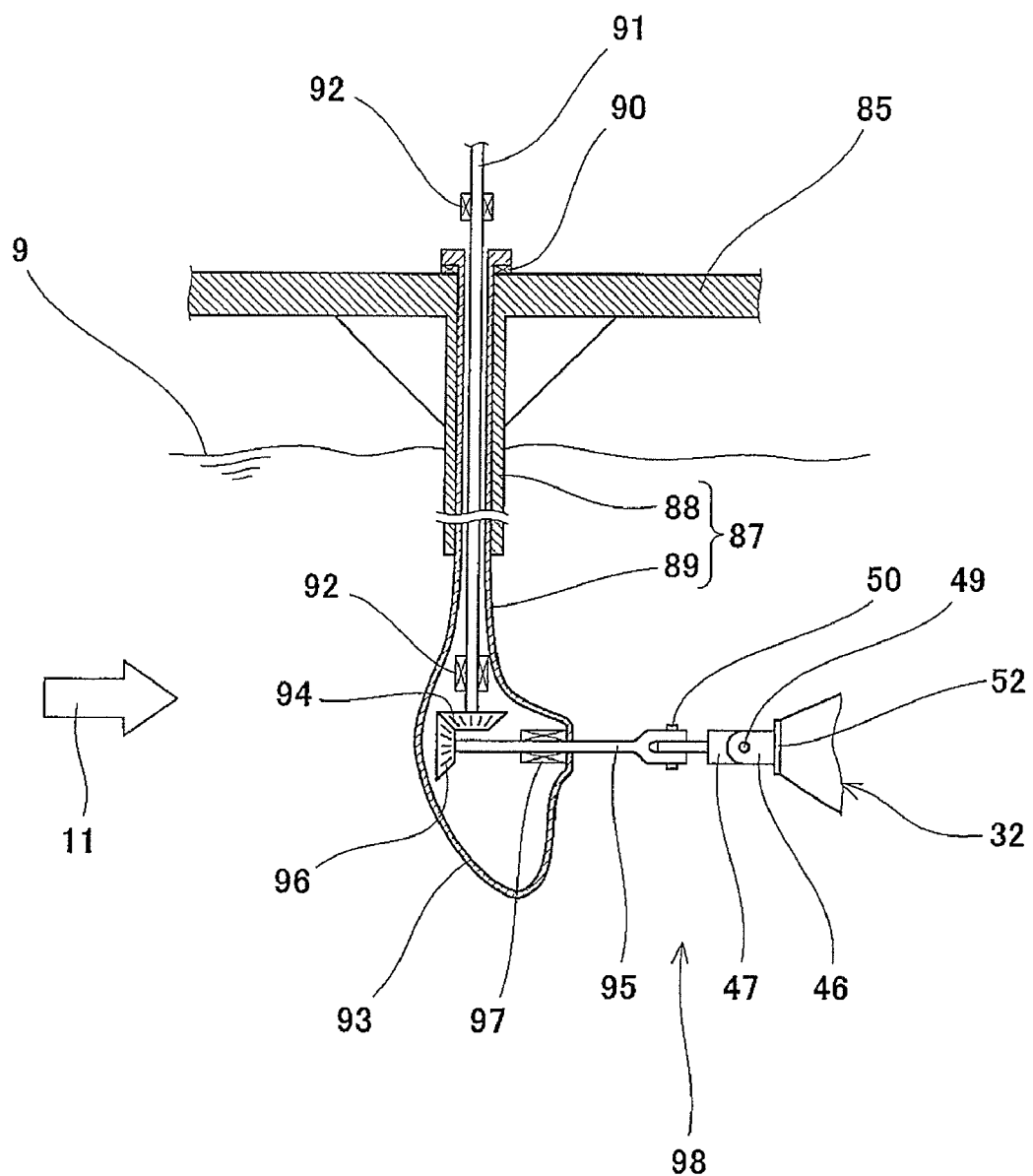
FIG. 11 is a partially enlarged cross-sectional view of the water flow electric power generator shown in FIG. 9.

FIG. 9 is a perspective view showing the water flow electric power generator according to Embodiment 4 of the present invention. FIG. 10 is a plan view of the water flow electric power generator shown in FIG. 9. FIG. 11 is a partially enlarged cross-sectional view of the water flow electric power generator shown in FIG. 9. The present embodiment will be explained using the underwater rotating body 32 of Embodiment 2. A water flow electric power generator 80 of the present embodiment is an example including the underwater rotating body 32 at a center portion of a scaffold-like frame 81. In the present embodiment, the same reference numbers are used for the same components as in Embodiment 2, and detailed explanations thereof are omitted.

As shown in FIGS. 9 and 10, the frame 81 of the water flow electric power generator 80 is formed by assembling lower horizontal members 82 fixed to the water bottom 8, upper horizontal members 83 provided above the water surface 9 by a certain distance, and vertical members 84 coupling the lower horizontal members 82 and the upper horizontal members 83. A device arranging portion 85 is provided at a center portion of the upper horizontal members 83, and an electric power generator 86 is provided on the device arranging portion 85.

As shown in FIG. 11, a supporting tube 87 is provided to extend downward from a center portion of the device arranging portion 85. The supporting tube 87 has a dual structure of an outer tube 88 and an inner tube 89. The outer tube 88 is fixed to a lower surface of the device arranging portion 85, and the inner tube 89 is supported by a bearing 90 so as to be able to turn inside the outer tube 88. A driven shaft 91 is provided inside the inner tube 89 so as to extend in a vertical direction. The driven shaft 91 is rotatably supported by bearings 92.

A cover portion 93 is provided at a lower end of the inner tube 89, and a bevel gear 94 configured to cause the driven shaft 91 to rotate is provided inside the cover portion 93. Moreover, a driving shaft 95 rotated by the rotation of the underwater rotating body 32 is provided inside the cover portion 93 so as to extend in a horizontal direction. A bevel gear 96 provided at the driving shaft 95 meshes with the bevel gear 94 of the driven shaft 91. The driving shaft 95 is rotatably supported by a bearing 97 provided inside the cover portion 93. The driving shaft 95 is coupled to the underwater rotating body 32 by a supporting portion 98 of the universal joint mechanism 45 including the front end coupling member 46 and the intermediate coupling member 47 which are coupled to each other by two pins 49 and 50 arranged to make an angle of 90 degrees.

In accordance with the water flow electric power generator 80 of the present embodiment, the inner tube 89 rotates such that the front end 52 of the underwater rotating body 32 faces the upstream of the water flow 11. When the underwater rotating body 32 is rotated by the water flow 11, the driving shaft 95 causes the driven shaft 91 to rotate via the bevel gears 96 and 94. When the driven shaft 91 is rotated, as shown in FIGS. 9 and 10, a driving gear 99 provided on the device arranging portion 85 is rotated, and a driven gear 100 of the electric power generator 86 is then rotated by the driving gear 99. Thus, the electric power generator 86 generates the electric power. Since the driving gear 99 has a large diameter, and the driven gear 100 has a small diameter, the electric power generator 86 can efficiently generate the electric power by being rotated while increasing its speed. This configuration is the speed increasing drive mechanism.

Moreover, the underwater rotating body 32 rotates while swinging as if the underwater rotating body 32 swims along the water flow 11 by the universal joint mechanism 45 provided at the supporting portion 98 of the front end 52. Therefore, even if the floating objects under the water contact the underwater rotating body 32, they are prevented from getting entangled with the underwater rotating body 32, and the underwater rotating body 32 absorbs the shock. Thus, the underwater rotating body 32 can stably rotate for a long period of time.

Figure 12:
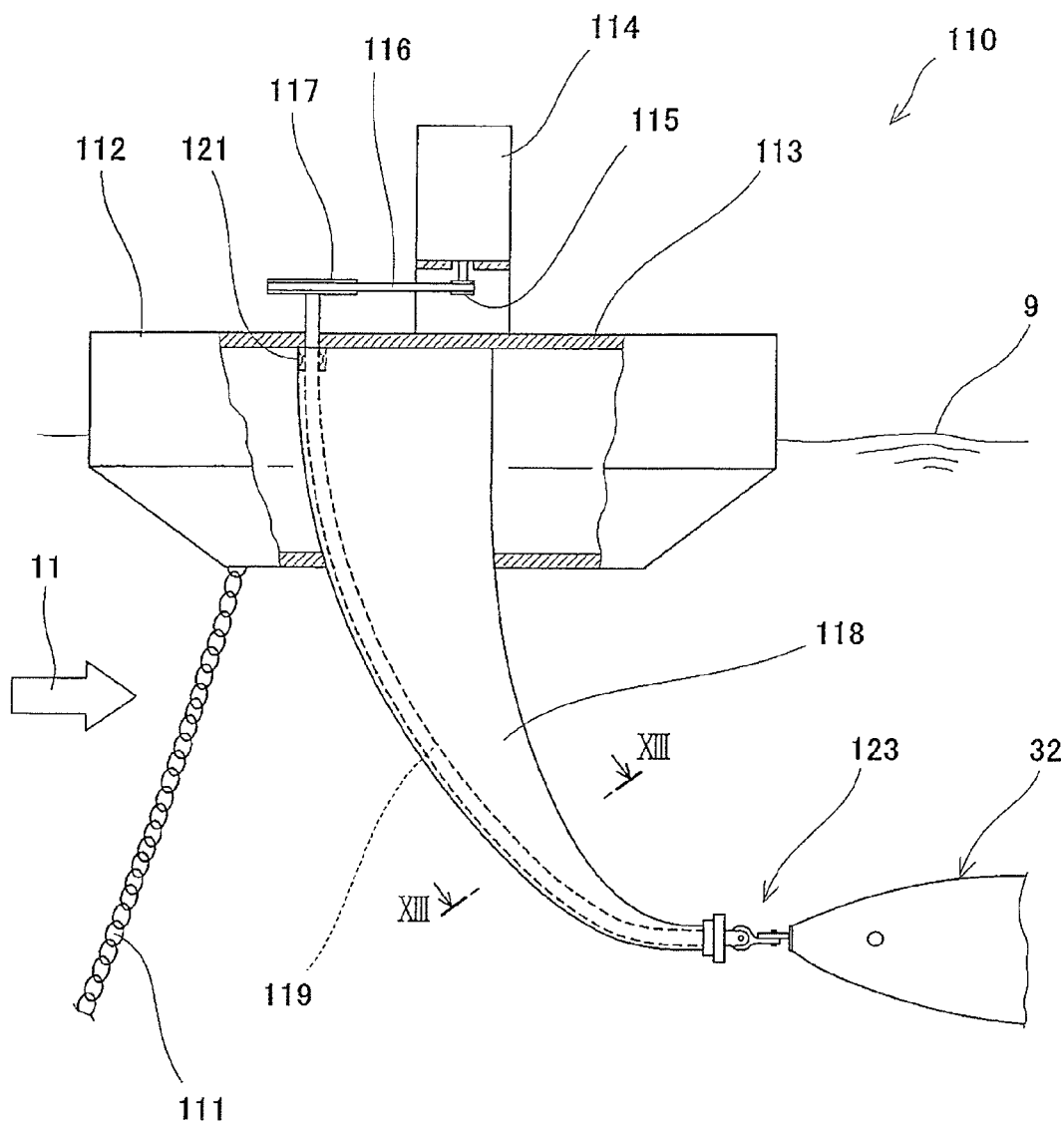
FIG. 12 is a side view showing a part of the water flow electric power generator according to Embodiment 5 of the present invention.
Figure 13:
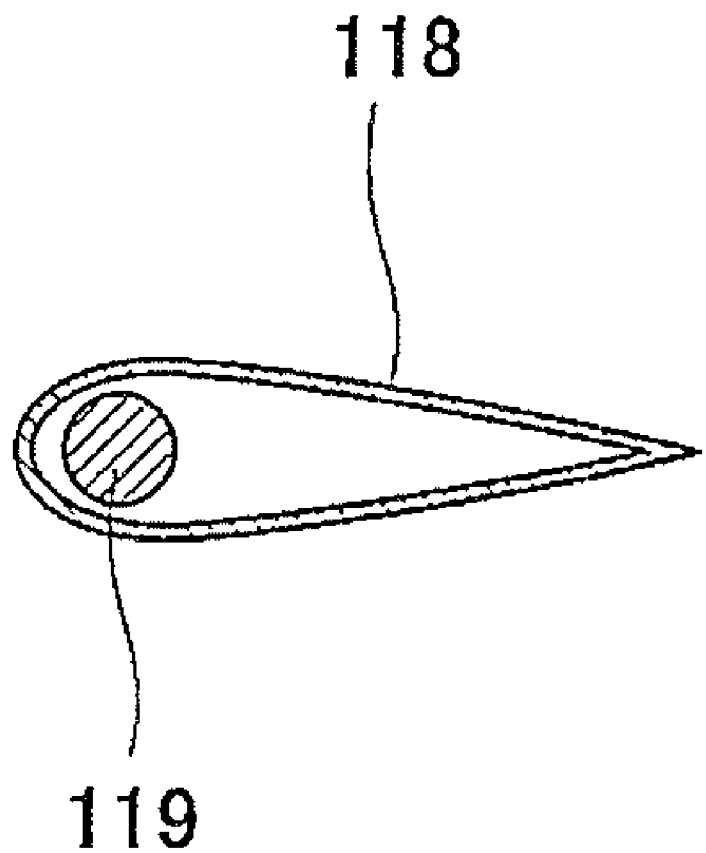
FIG. 13 is a view of a cross section taken along line XIII-XIII of FIG. 12.
Figure 14:
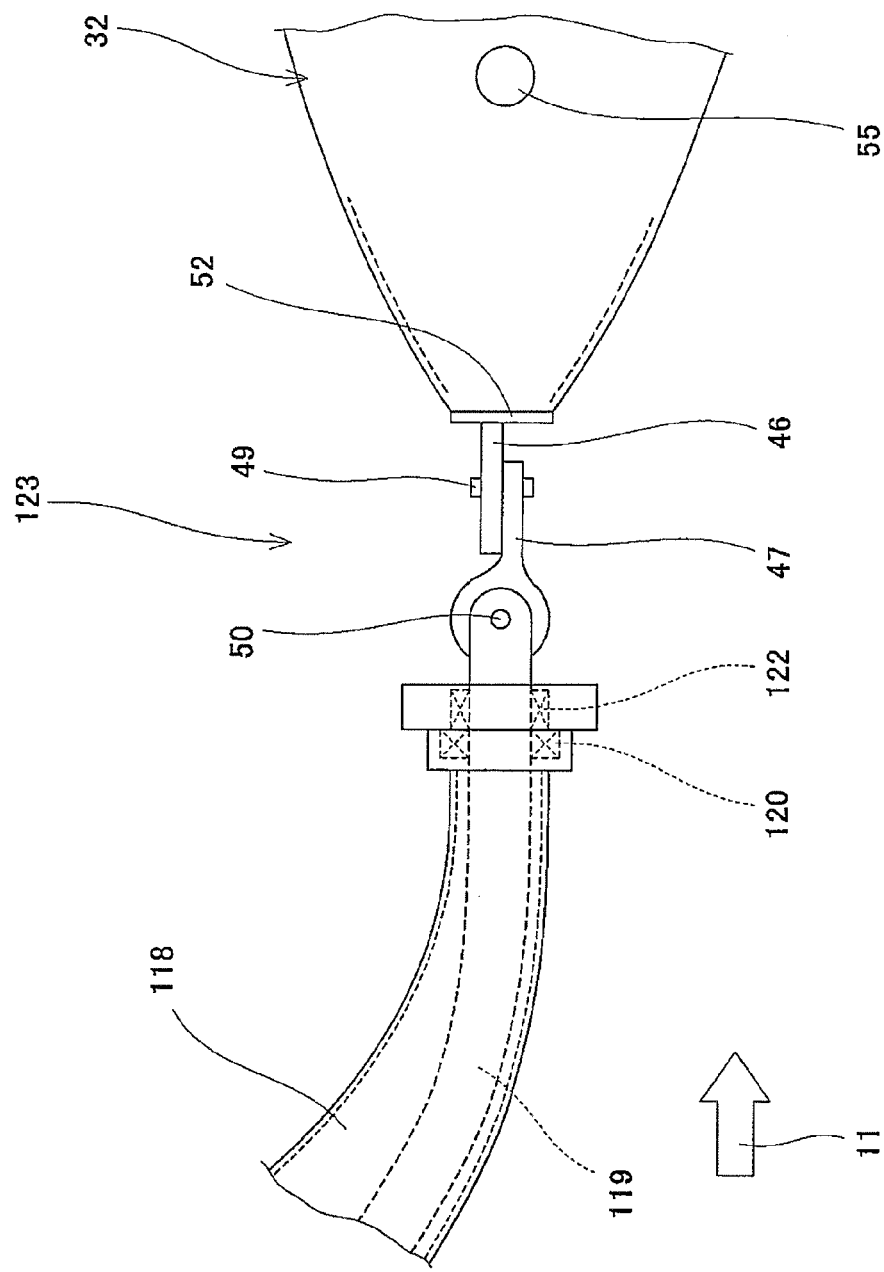
FIG. 14 is a partially enlarged side view of the water flow electric power generator shown in FIG. 12.

FIG. 12 is a side view showing a part of the water flow electric power generator according to Embodiment 5 of the present invention. FIG. 13 is a view of a cross section taken along line XIII-XIII of FIG. 12. FIG. 14 is a partially enlarged side view of the water flow electric power generator shown in FIG. 12. The present embodiment is an example preferably used in a case where the electric power is generated by the water flow 11 close to the water surface 9, such as a case where the water depth is shallow. The present embodiment will be explained using the underwater rotating body 32 of Embodiment 2. Moreover, in the present embodiment, the same reference numbers are used for the same components as in Embodiment 2, and detailed explanations thereof are omitted.

As shown in FIG. 12, a water flow electric power generator 110 of the present embodiment includes a buoy 112 fixed by a chain 111 to an anchor (not shown) at the water bottom and floating on the water surface 9. An upper surface of the buoy 112 is a device arranging portion 113 located above the water. On the device arranging portion 113, an electric power generator 114 and a driving pulley 117 configured to drive a driven pulley 115 of the electric power generator 114 by a belt 116 are provided. These components constitute the speed increasing drive mechanism.

A shaft guiding portion 118 is provided on a lower surface of the buoy 112 so as to extend downward to the water. As shown in FIG. 13, the shaft guiding portion 118 is formed to have a streamline-shaped cross section, and a flexible shaft 119 is provided inside the shaft guiding portion 118. As shown in FIG. 12, an upper end of the flexible shaft 119 is coupled to a driving pulley 117, and the driving pulley 117 is rotated by the flexible shaft 119. Moreover, an upper portion of the flexible shaft 119 is rotatably supported by a bearing 121 provided at the device arranging portion 113. For example, the flexible shaft 119 is formed by twisting a combination of a hard steel wire and a soft steel wire or twisting a spring material. A wire may be put in the center of the flexible shaft 119 to increase the strength of the flexible shaft 119.

As shown in FIG. 14, a lower portion of the flexible shaft 119 is rotatably supported by a bearing 120 provided at a lower portion of the shaft guiding portion 118. A sealing member 122 is provided outside the bearing 120. A lower end of the flexible shaft 119 is coupled to the front end 52 of the underwater rotating body 32 by a supporting portion 123 of the universal joint mechanism 45. The universal joint mechanism 45 is constituted by the front end coupling member 46 and the intermediate coupling member 47 which are coupled to each other by two pins 49 and 50 arranged to make an angle of 90 degrees.

In accordance with the water flow electric power generator 110, the underwater rotating body 32 rotates while swinging along the water flow 11 at the water depth comparatively close to the water surface, and the electric power generator 114 is rotated by the underwater rotating body 32 via the flexible shaft 119. Thus, the electric power can be generated. The present embodiment is adopted in a case where the water flow 11 having an adequate speed can be obtained at a position comparatively close to the water surface.

Figure 15:
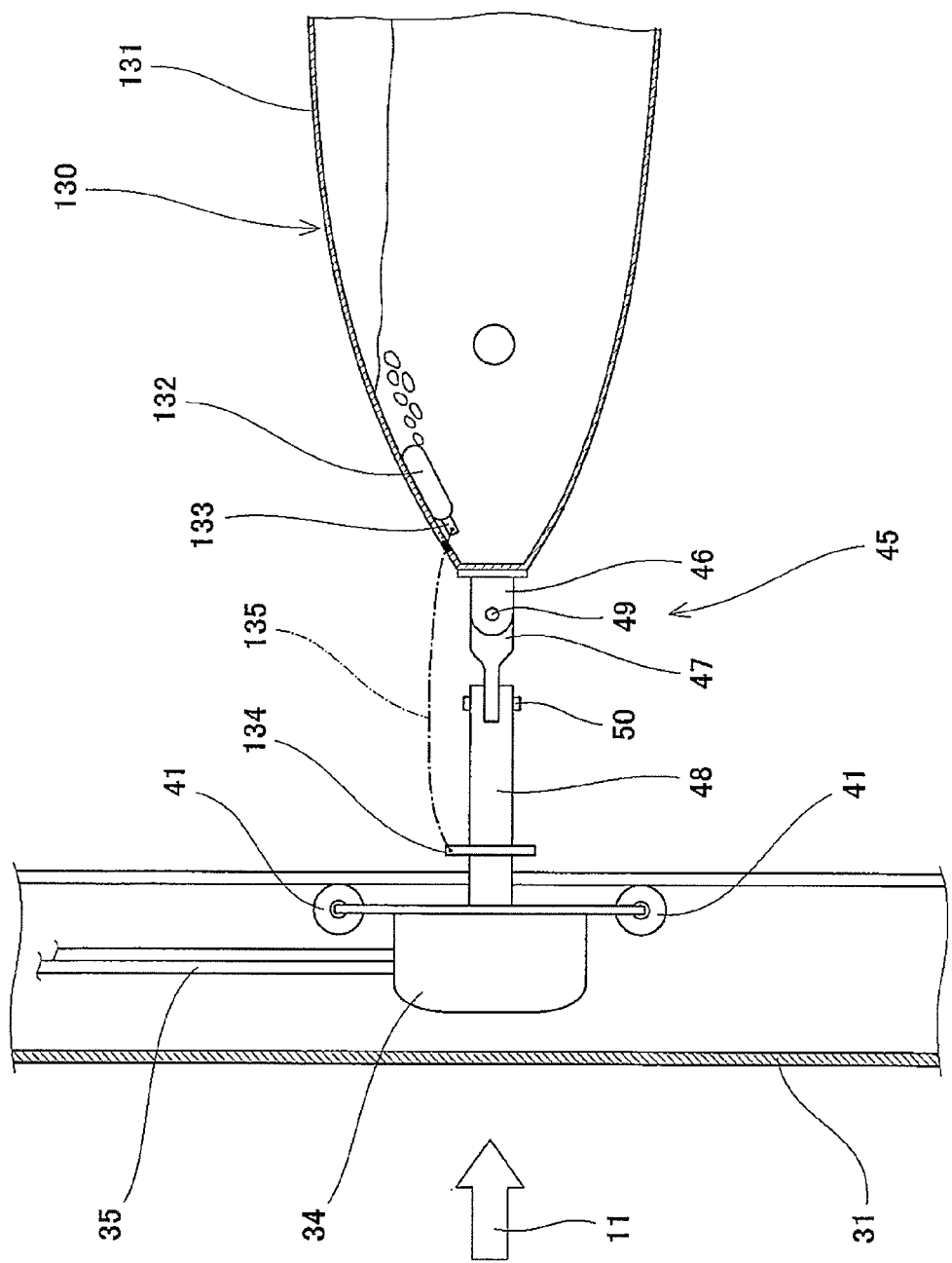
FIG. 15 is an enlarged partial side view showing another example of the underwater rotating body of the water flow electric power generator of the present invention.

FIG. 15 is an enlarged partial side view showing another example of the underwater rotating body of the water flow electric power generator of the present invention. In this example, the same reference numbers are used for the same components as in Embodiment 2. An underwater rotating body 130 is a preferable example in a case where the underwater rotating body 130 comes off the vertical member 31, a case where the underwater rotating body 130 needs to float quickly, or the like.

As shown in FIG. 15, a carbon dioxide bomb 132 is provided inside a hollow body portion 131 of the underwater rotating body 130. The carbon dioxide bomb 132 is provided with an injection lever 133. The injection lever 133 and a flange 134 fixed to the pump coupling shaft 48 of the driving liquid pressure pump 34 are connected to each other by a wire 135.

In accordance with the underwater rotating body 130, even if the underwater rotating body 130 is separated from the vertical member 31 by the universal joint mechanism 45, the wire 135 automatically breaks, so that a carbon dioxide gas is injected into the body portion 131. Therefore, the underwater rotating body 130 can automatically float by the gas. On this account, even in a case where the underwater rotating body 130 comes off the vertical member 31, the underwater rotating body 130 floats on the water surface 9 and can be therefore recovered quickly.

Moreover, in a case where the injection lever 133 of the carbon dioxide bomb 132 is configured to be able to be operated remotely, the gas in the carbon dioxide bomb 132 can be injected into the body portion 131 according to a need to cause the underwater rotating body 130 to float quickly. In this example, the carbon dioxide bomb 132 is provided inside the body portion 131. However, another gas bomb may be provided.

Figure 16:
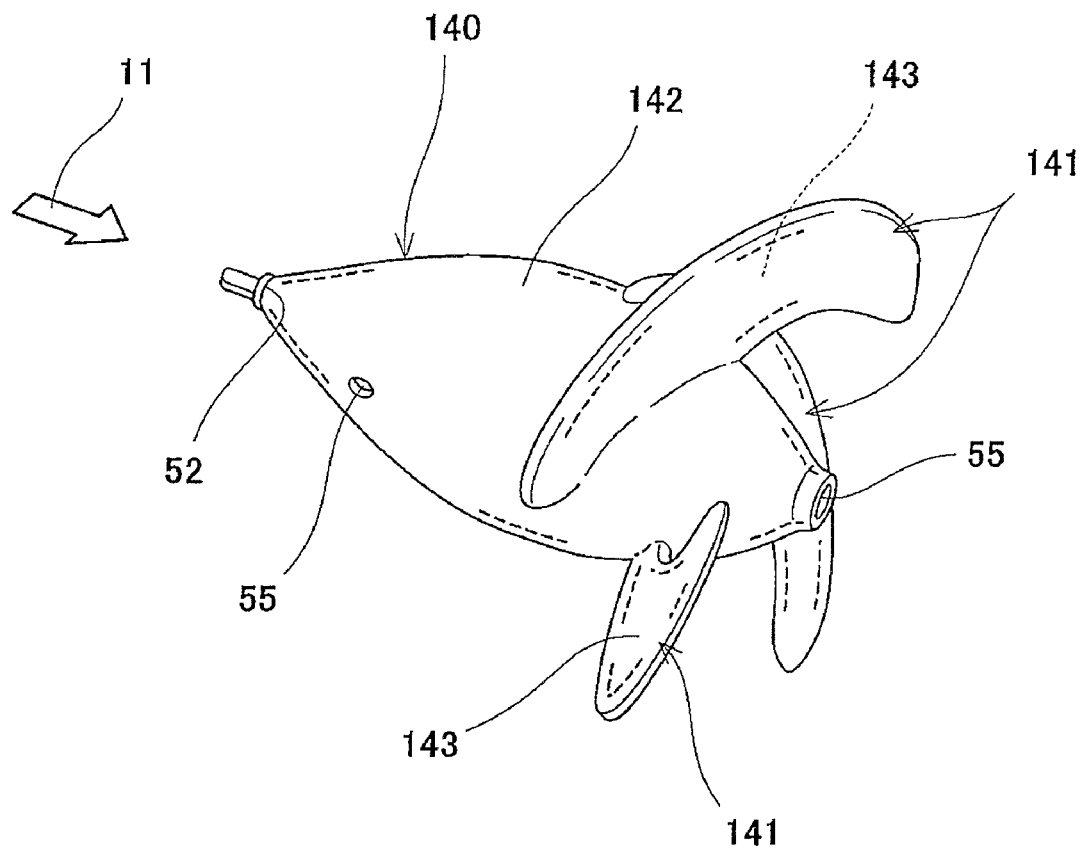
FIG. 16 is a perspective view showing another example of the underwater rotating body of the water flow electric power generator of the present invention.
Figure 17:
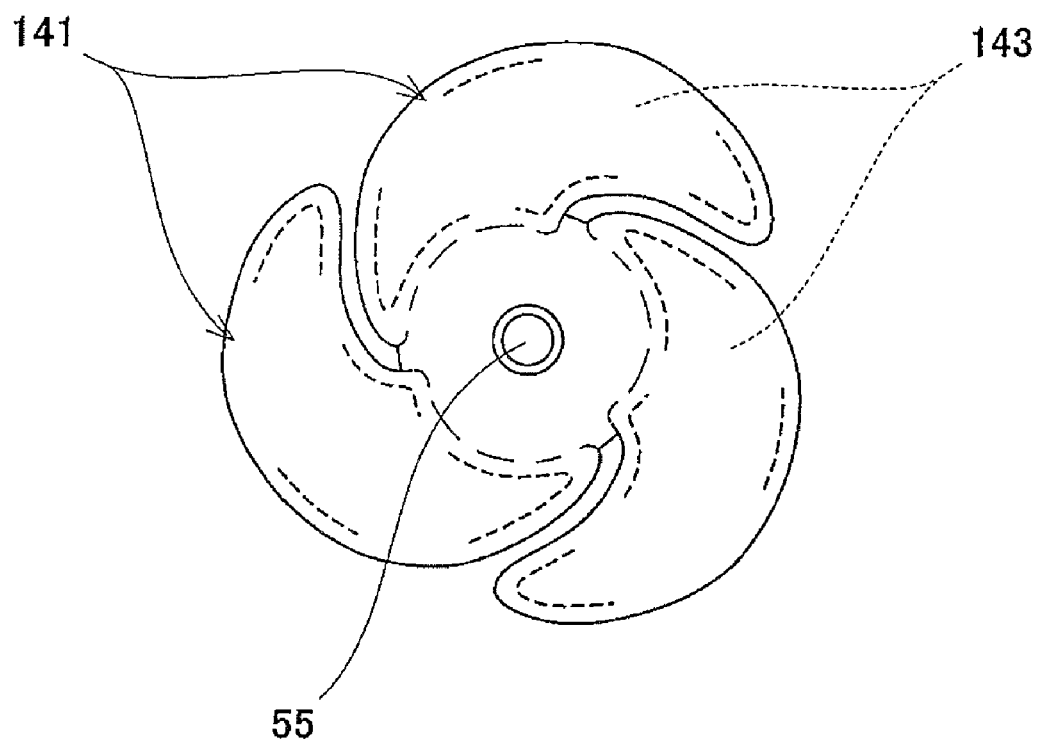
FIG. 17 is a rear view of the underwater rotating body shown in FIG. 16.
Figure 18:
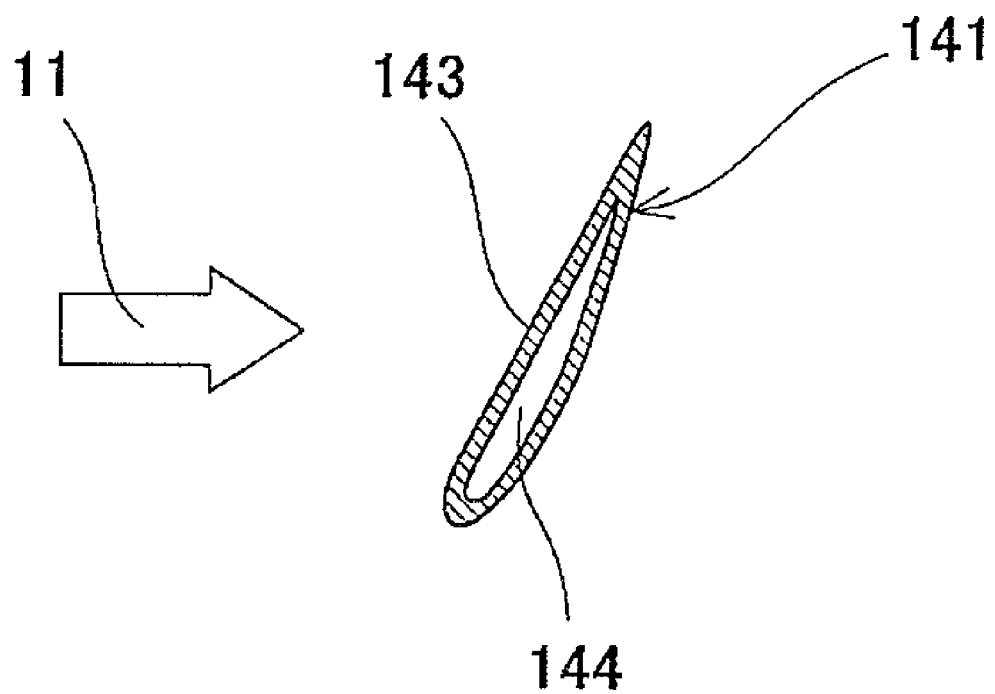
FIG. 18 is a cross-sectional view of a wing of the underwater rotating body shown in FIG. 16.

FIG. 16 is a side view showing another example of the underwater rotating body of the water flow electric power generator of the present invention. FIG. 17 is a rear view of the underwater rotating body shown in FIG. 16. FIG. 18 is a cross-sectional view of the wing of the underwater rotating body shown in FIG. 16. As shown in FIG. 16, the shape of a wing 141 of an underwater rotating body 140 is different from that of the above embodiment. The wing 141 is formed to extend so that the wing 141 winds around an outer periphery of the body portion 142 while inclining at a moderate angle from a front end, that is a coupled base portion of the wing 141 coupled to a body portion 142, toward a rear side of the wing 141. In this example, as shown in FIG. 17, three wings 141 are provided, and a rear end of each wing 141 extends to a position close to the coupled base portion of an adjacent wing 141. The wings 141 form wide wing surfaces 143 around the body portion 142 in a front view (FIG. 17 is a rear view). The number of wings 141, the shape of the wing 141, and the like may be determined based on conditions, such as the diameter of the body portion 142. Moreover, in this example, by increasing the area of the wing surface 143 of the wing 141, the wing surface 143 generates a high resisting power with respect to the water flow 11. With this, even in a case where the water flow 11 is low in speed, the underwater rotating body 140 can stably rotate while maintaining its posture. In the underwater rotating body 140, only the front end of the wing 141 is fixed to the body portion 142, and a gap is provided between a rear portion of the wing 141 and the body portion 142. With this, even if the floating objects under the water contact the wing 141, they easily flow backward.

Moreover, the wing 141 in this example is formed such that in a cross-sectional shape shown in FIG. 18, a front surface thereof is a substantially flat surface whereas a rear surface thereof is a streamline-shaped surface. By forming the wing 141 having such cross-sectional shape, the resisting power is generated at the front surface of the wing 141 whereas a lifting power is generated at the rear surface thereof. By a total power of the resisting power and the lifting power, the underwater rotating body 140 can stably rotate while maintaining its rotational center in the water flow 11.

Further, a hollow portion 144 is formed inside the wing 141 and is an independent space separated from the inside of the body portion 142. A gas capable of causing the underwater rotating body 140 to float is put in each hollow portion 144. Air or the like is used as this floating gas. As above, the hollow portion 144 is formed inside the wing 141, and the air is put in the hollow portion 144. With this, even if the underwater rotating body 140 comes off the vertical member (FIG. 15), the underwater rotating body 140 automatically floats on the water and can be recovered quickly.

Figure 19:
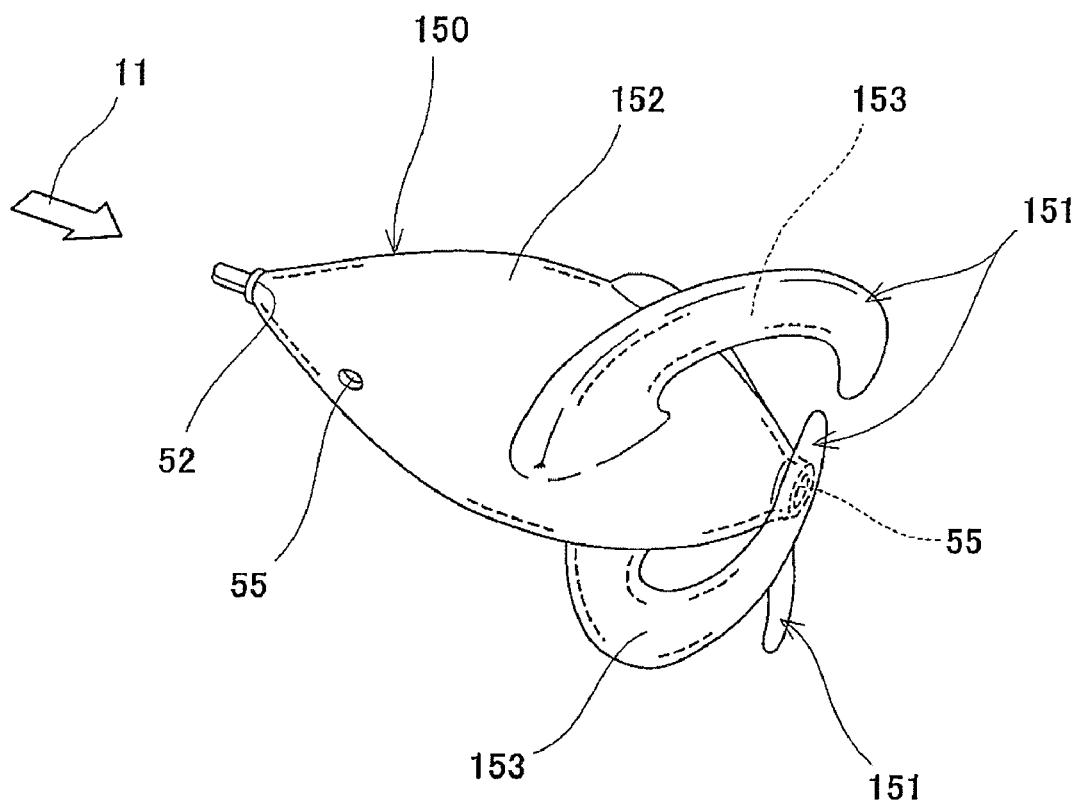
FIG. 19 is a perspective view showing one example of the underwater rotating body having the wing which is different in shape from the wing of the underwater rotating body shown in FIG. 16.

FIG. 19 is a perspective view showing one example of the underwater rotating body having the wing which is different in shape from the wing of the underwater rotating body shown in FIG. 16. An underwater rotating body 150 in this example is different from the underwater rotating body 140 shown in FIG. 16 in the shape of the wing 141. As shown in FIG. 19, a wing 151 of the underwater rotating body 150 is formed to extend so that the wing 151 surrounds an outer periphery of a body portion 152 while inclining at a large angle from a front end that is a coupled base portion of the wing 151 coupled to the body portion 152 toward a rear side of the wing 151. The underwater rotating body 150 is provided with three wings 151. A rear end of each wing 151 extends to a position close to the coupled base portion of the adjacent wing 151. The wings 151 form wide wing surfaces 153 around the body portion 152 in a front view. The wing surface 153 of the wing 151 in this example has a smaller area than that of the wing 141, and an inclination angle of the wing 151 toward the rear side is larger than that of the wing 141. Even in a case where the water flow 11 is high in speed, the underwater rotating body 150 can stably rotate while maintaining its posture by the shapes of the wings 151. Moreover, in the underwater rotating body 150, only the front end of the wing 151 is fixed to the body portion 152, and a gap is provided between a rear portion of the wing 151 and the body portion 152. With this, even if the floating objects under the water contact the wing 151, they easily flow backward. Whether to use the wing surface 153 having a small area as in this example or the wing surface 143 of the wing 141 having a large area may be determined based on use conditions, such as the speed of the water flow 11.

Respective components in the above embodiments can be combined with one another. The components in the above embodiments may be suitably combined with one another depending on the use conditions and the like. The present invention is not limited to the above embodiments.

Moreover, the universal joint mechanism 45 in each of the above embodiments may be configured differently as long as the supporting portion can support the underwater rotating body such that the underwater rotating body can swing in a direction intersecting with the underwater rotating body axial direction.

Further, each of the above embodiments shows one example. Various modifications can be made within the scope of the present invention, and the present invention is not limited to the above embodiments.

INDUSTRIAL APPLICABILITY

The water flow electric power generator according to the present invention can be utilized for the water flow electric power generation carried out at a place where a predetermined water flow, such as the tidal current, the Kuroshio current, or the river current, can be stably obtained.

The invention claimed is:
1. A water flow electric power generator comprising:
an underwater rotating body configured to rotate by a water flow;
a holding portion configured to hold a front end of the underwater rotating body at a predetermined position under water;
a power transmission unit configured to transfer a rotational power of the underwater rotating body held by the holding portion to above a water surface; and
an electric power generator disposed above the water surface to be driven by power transferred by the power transmission unit, wherein
the underwater rotating body includes: a body portion having a streamline shape from a front end thereof to a rear end thereof; a supporting portion located between a front end of the body portion and the holding portion to be able to swing in a direction intersecting with an underwater rotating body axial direction; and a plurality of wings configured to project radially from a periphery of the body portion, wherein
the body portion of the underwater rotating body is hollow and provided with a communication hole which is communicated with outside such that the water flows therethrough into the body portion.

2. The water flow electric power generator according to claim 1, wherein the communication hole is formed at each of a front portion of the body portion and the rear end of the body portion.

3. The water flow electric power generator according to claim 1, wherein a gas injection mechanism configured to inject a gas into the body portion to cause the underwater rotating body to float is included in the body portion of the underwater rotating body.

4. The water flow electric power generator according to claim 1, wherein the power transmission unit is constituted by a speed increasing drive mechanism including a driving shaft configured to be driven by the underwater rotating body and a driven shaft coupled to the driving shaft to cause the electric power generator to rotate.

5. The water flow electric power generator according to claim 1, wherein the power transmission unit is constituted by a liquid pressure drive mechanism including a driving liquid pressure pump configured to be driven by the underwater rotating body and a driven liquid pressure pump configured to be driven by a liquid supplied by the driving liquid pressure pump and cause the electric power generator to rotate.

6. The water flow electric power generator according to claim 5, wherein the driving liquid pressure pump is a low-speed rotation pump, and the driven liquid pressure pump is a high-speed rotation pump.

7. The water flow electric power generator according to claim 5, wherein the holding portion includes: a frame fixed to a water bottom; a device arranging portion located at an upper portion of the frame to allow the electric power generator to be disposed above the water surface; and a lifting unit configured to cause the underwater rotating body and the power transmission unit to move up and down along the frame.

8. The water flow electric power generator according to claim 7, wherein the underwater rotating body is one of a plurality of underwater rotating bodies of the water flow electric power generator, and wherein the lifting unit is able to cause the plurality of underwater rotating bodies to move up and down along the frame at predetermined intervals.

9. The water flow electric power generator according to claim 1, wherein the power transmission unit is constituted by a flexible shaft drive mechanism including a flexible shaft configured to be driven by the underwater rotating body and a speed increasing drive mechanism coupled to the flexible shaft to cause the electric power generator to rotate.

10. The water flow electric power generator according to claim 9, wherein the holding portion includes a floating body configured to float on the water surface and an anchor configured to hold the floating body at a predetermined position.

11. A water flow electric power generator comprising:
an underwater rotating body configured to rotate by a water flow;
a holding portion configured to hold a front end of the underwater rotating body at a predetermined position under water;
a power transmission unit configured to transfer a rotational power of the underwater rotating body held by the holding portion to above a water surface; and
an electric power generator disposed above the water surface to be driven by power transferred by the power transmission unit, wherein
the underwater rotating body includes: a body portion having a streamline shape from a front end thereof to a rear end thereof; a supporting portion located between a front end of the body portion and the holding portion to be able to swing in a direction intersecting with an underwater rotating body axial direction; and a plurality of wings configured to project radially from a periphery of the body portion, wherein
a hollow portion is formed inside each of the wings, and a floating gas is put in the hollow portion.

12. A water flow electric power generator comprising:
an underwater rotating body configured to rotate by a water flow;
a holding portion configured to hold a front end of the underwater rotating body at a predetermined position under water;
a power transmission unit configured to transfer a rotational power of the underwater rotating body held by the holding portion to above a water surface; and
an electric power generator disposed above the water surface to be driven by power transferred by the power transmission unit, wherein
the underwater rotating body includes: a body portion having a streamline shape from a front end thereof to a rear end thereof; a supporting portion located between a front end of the body portion and the holding portion to be able to swing in a direction intersecting with an underwater rotating body axial direction; and a plurality of wings configured to project radially from a periphery of the body portion, wherein
each wing is formed around an outer periphery of the body portion while inclining from a coupled base portion of the wing coupled to the body portion toward a rear side of the wing; and
a rear end of each wing of the underwater rotating body extends to a coupled base portion of an adjacent one of the plurality of wings in a front view.

\* \* \* \* \*